US009322530B2

(12) United States Patent
Kimura et al.

(10) Patent No.: US 9,322,530 B2
(45) Date of Patent: Apr. 26, 2016

(54) LIGHT SOURCE DEVICE

(71) Applicant: Hitachi Maxell, Ltd., Osaka (JP)

(72) Inventors: Nobuyuki Kimura, Tokyo (JP); Kohei Miyoshi, Tokyo (JP)

(73) Assignee: HITACHI MAXELL, LTD., Osaka (JP)

( * ) Notice: Subject to any disclaimer, the term of this patent is extended or adjusted under 35 U.S.C. 154(b) by 61 days.

(21) Appl. No.: 14/240,799

(22) PCT Filed: Sep. 26, 2012

(86) PCT No.: PCT/JP2012/074617
§ 371 (c)(1),
(2) Date: Feb. 25, 2014

(87) PCT Pub. No.: WO2013/047542
PCT Pub. Date: Apr. 4, 2013

(65) Prior Publication Data
US 2014/0218623 A1 Aug. 7, 2014

(30) Foreign Application Priority Data

Sep. 26, 2011 (WO) .................. PCT/JP2011/005358
Mar. 5, 2012 (WO) .................. PCT/JP2012/001480

(51) Int. Cl.
*G03B 21/20* (2006.01)
*H04N 9/31* (2006.01)
(Continued)

(52) U.S. Cl.
CPC ............... *F21V 9/16* (2013.01); *G03B 21/204* (2013.01); *G03B 21/2013* (2013.01); *G03B 33/12* (2013.01); *H04N 5/74* (2013.01); *H04N 9/3111* (2013.01)

(58) Field of Classification Search
CPC .... G03B 21/204; G03B 21/20; H04N 9/3111; H04N 9/31; H04N 9/3164
USPC ........................................ 353/94, 84; 362/260
See application file for complete search history.

(56) References Cited

U.S. PATENT DOCUMENTS 8,783,886 B2 * 7/2014 Huang ............................ 362/34
9,052,582 B2 * 6/2015 Komatsu
(Continued)

FOREIGN PATENT DOCUMENTS

| JP | 2010-085740 | 4/2010 |
| JP | 2011-065770 | 3/2011 |

(Continued)

*Primary Examiner* — William C Dowling
*Assistant Examiner* — Ryan Howard
(74) *Attorney, Agent, or Firm* — Baker Botts L.L.P.

(57) ABSTRACT

There is provided a light source device which, when a light source which excites a phosphor with excitation light and emits fluorescent light is used, reduces incidence of the excitation light to an excitation light source to increase an output of the excitation light and extend the life.

The light source device is provided with a plurality of excitation light sources emitting excitation light and a phosphor changing excitation light to fluorescent light, and the excitation light sources are arranged so that each excitation light emitted from each of the excitation light sources asymmetrically enters an excitation light irradiation region on a phosphor. A mirror is installed on an optical path of unconverted excitation light reflected from the phosphor and returns the unconverted excitation light to the phosphor side, whereby the unconverted excitation light can be utilized as excitation light again.

14 Claims, 13 Drawing Sheets

(51) Int. Cl.
*F21V 9/16* (2006.01)
*G03B 33/12* (2006.01)
*H04N 5/74* (2006.01)

(56) References Cited

U.S. PATENT DOCUMENTS

2010/0328627 A1  12/2010  Miyazaki
2011/0292349 A1* 12/2011  Kitano et al. ................... 353/31

FOREIGN PATENT DOCUMENTS

| | | |
|---|---|---|
| JP | 2011-112753 | 6/2011 |
| JP | 2011-128522 | 6/2011 |
| JP | 2011-187295 | 9/2011 |
| JP | 2012-013977 | 1/2012 |
| JP | 2012-037638 | 2/2012 |

* cited by examiner (A)

(B)

(A)

(B)

(C)

(D)

(A)

(B)

(C)

(D)

LIGHT SOURCE DEVICE

TECHNICAL FIELD

The present invention relates to a light source device.

BACKGROUND ART

In the technical field concerned, there has been proposed a light source device which emits visible light, emitted from a solid light source, with high efficiency (see, PTL 1). In the PTL 1, a phosphor disposed on a rotation-controllable circular base material is irradiated with light emitted from a plurality of blue excitation light sources to emit highly efficient fluorescent light.

CITATION LIST

Patent Literature

PTL 1: JP 2011-13320 A

SUMMARY OF INVENTION

Technical Problem

According to PTL 1, although it is described that unconverted excitation light not converted into fluorescent light among excitation light entering a phosphor does not enter on the illumination optical system side, it is not described that the unconverted excitation light enters an excitation light source to cause reduction of output and life of the excitation light source.

Thus, an object of the invention is to provide a light source device in which output and life of an excitation light source are improved.

Solution to Problem

One of preferred modes of the invention for solving the aforementioned problems is as follows. The light source device is provided with a plurality of excitation light sources emitting excitation light and a phosphor changing the excitation light to fluorescent light, and the excitation light sources are arranged so that each excitation light emitted from each of the excitation light sources asymmetrically enters an excitation light irradiation region on the phosphor.

Advantageous Effects of Invention

According to the invention, a light source device in which output and life of an excitation light source are improved can be provided.

DESCRIPTION OF EMBODIMENTS

Figure 1:
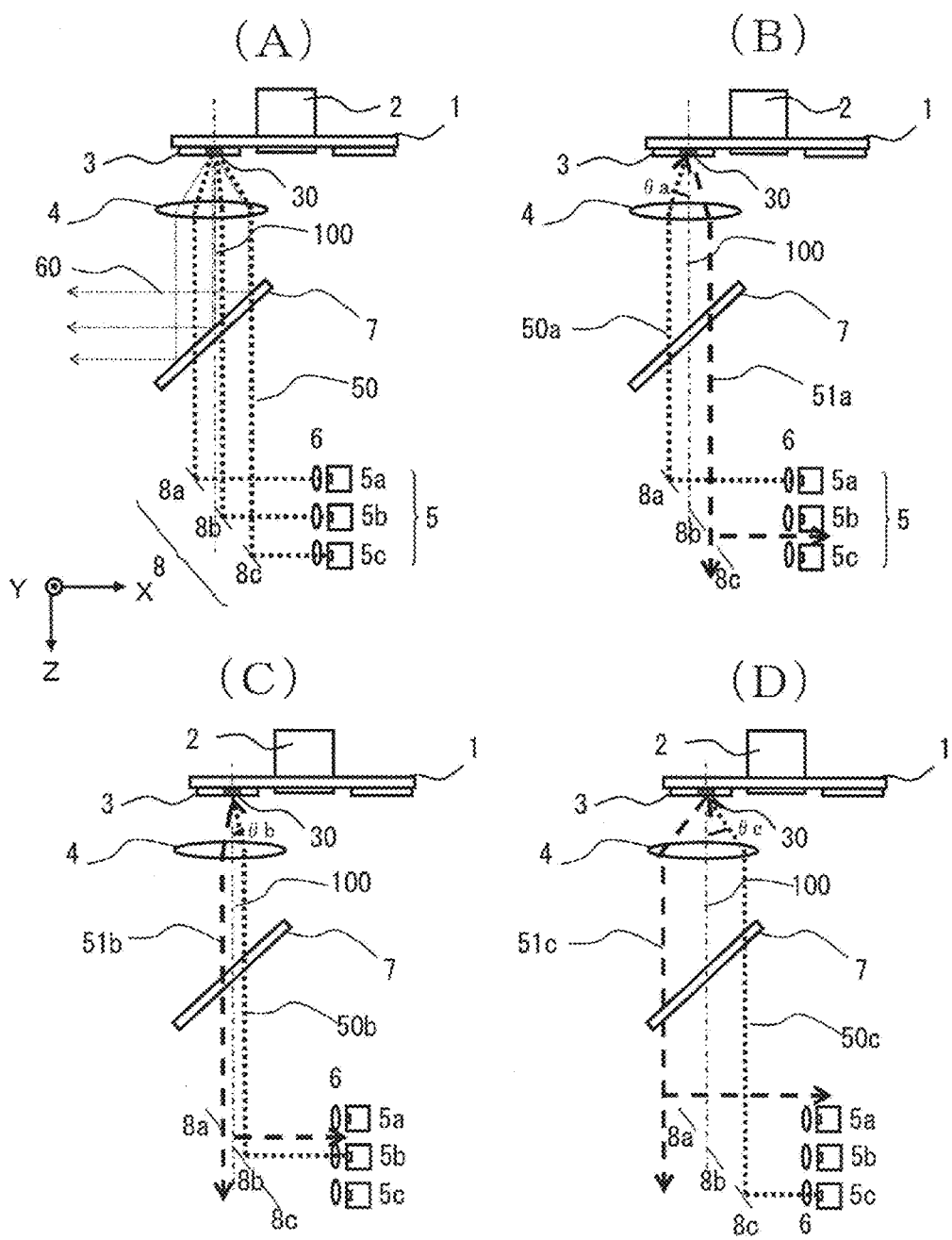
FIG. 1 is a view illustrating a portion of a light source device of an example 1.

Hereinafter, examples will be described with reference to the accompanying drawings. In each drawing, the same components as those in the foregoing drawings are assigned the same reference numerals, and description of already-described components will be omitted. First, a light source device considered as a problem of this example will be described.

Figure 4:
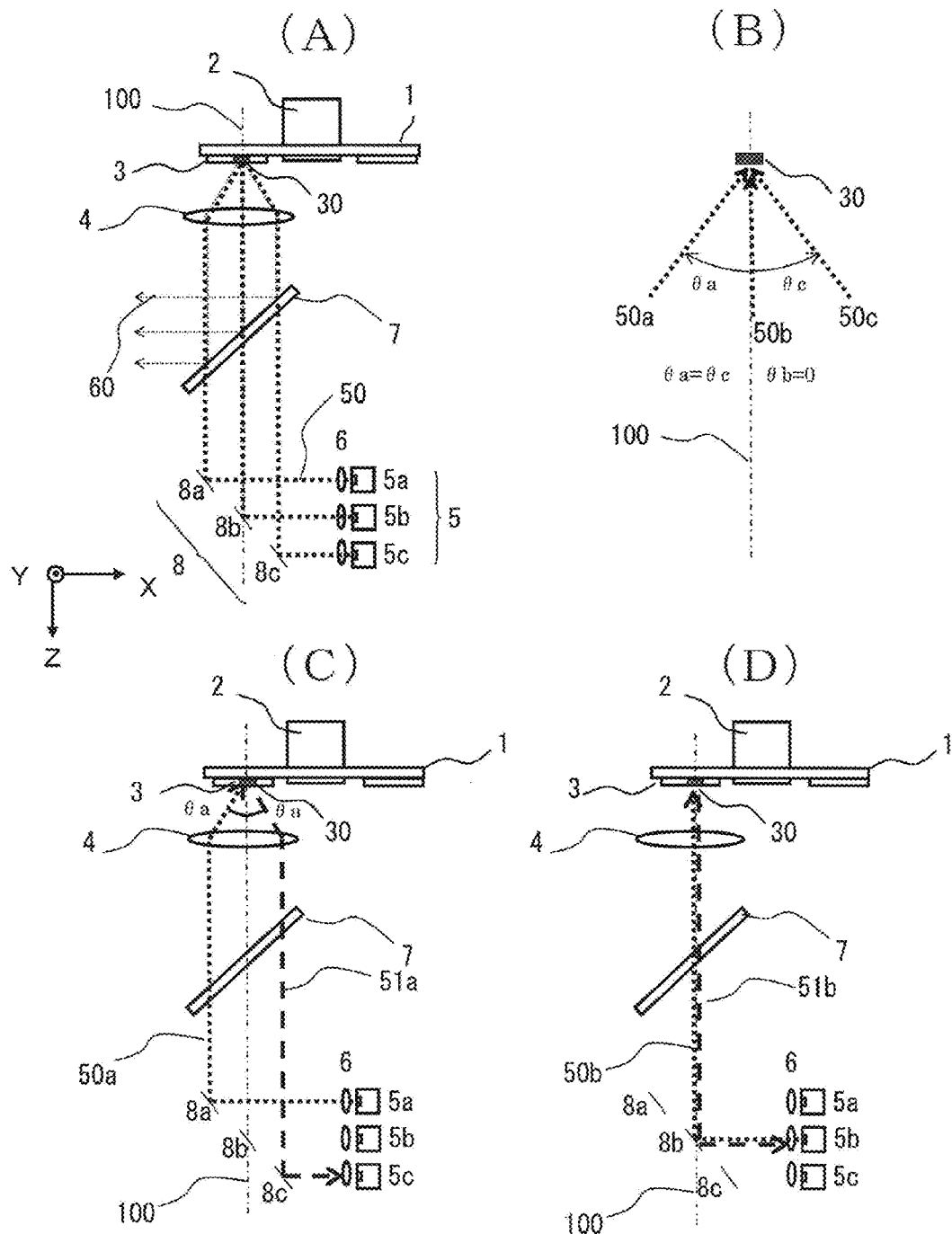
FIG. 4 is a view illustrating a portion of the light source device considered as a problem of the example 1.

FIG. 4 is a view illustrating a portion of alight source device considered as a problem of an example 1, FIG. 4(A) is a configuration explanatory view, FIG. 4(B) is a view illustrating an excitation light incident angle to a phosphor, and FIGS. 4(C) and 4(D) are configuration explanatory views illustrating a principle of incidence of excitation light to an excitation light source as a problem. Here, a local right side orthogonal coordinate system is introduced. In FIG. 4, a travelling direction of the excitation light after being reflected by a reflecting mirror is a Z axis, an axis parallel to a paper surface in a plane perpendicular to the Z axis is an X axis, and an axis extending from the rear side of the paper surface to the front side is a Y axis.

In FIG. 4(A), an excitation light group 50 emitted from an excitation light source group 5 including a plurality of excitation light sources constituted of solid light-emitting elements is made substantially parallel light by a collimator lens group 6 to be reflected by a reflecting mirror 8, and thus to enter a dichroic mirror 7. The dichroic mirror 7 has a characteristic of transmitting through a wavelength band of excitation light and reflecting a wavelength band of fluorescent light. Thus, the excitation light group 50 transmits through the dichroic mirror 7 to be transmitted through a condensing lens 4, and, thereafter, to enter a disk 1 coated with a phosphor 3. The curvature of the condensing lens 4 is set so that parallel light entering the condensing lens 4 is condensed in an excitation light irradiation region 30 of the disk 1.

The disk 1 is a rotation-controllable circular base material with a rotation element 2 as a center axis. In order to release heat generated from a phosphor, metal is preferably used as the base material. In this case, the phosphor 3 on the disk 1 excited by the excitation light group 50 emits fluorescent light 60 in all azimuths, the fluorescent light 60 emitted toward the base material is reflected by a metal surface of the base material. Accordingly, all the fluorescent lights 60 are emitted toward the condensing lens 4. The fluorescent lights 60 having been transmitted through the condensing lens 4 among all the fluorescent lights 60 become substantially parallel lights to be reflected by the dichroic mirror 7, and thus to enter on an illumination optical system side (not shown). In the drawing, although an interval between the phosphor 3 and the condensing lens 4 is large, in fact, the condensing lens 4 is located near the phosphor 3, whereby substantially all the fluorescent lights 60 can be captured by the condensing lens 4. When an axis that passes through the excitation light irradiation region 30 and is parallel to the Z axis is an optical axis 100, the excitation light group 50 emitted from the excitation light source group 5 enters the excitation light irradiation region 30 on the phosphor 3 symmetrically to the optical axis 100.

In FIG. 4(B), in excitation lights 50a, 50b, and 50c generated respectively from excitation light sources 5a, 5b, and 5c, and when the incident angles of the excitation lights 50a, 50b, and 50c to the excitation light irradiation region 30 with respect to the optical axis 100 are respectively θa, θb, and θc, the excitation light enters symmetrically to the optical axis 100; therefore, a mathematical formula 1 is established.

$$\theta a=\theta c, \theta b=0 \quad \text{(mathematical formula 1)}$$

In FIG. 4(C), the excitation light 50a emitted from the excitation light source 5a of the excitation light source group 5 enters the excitation light irradiation region 30 at the incident angle θa through the above optical path. Some of the excitation lights 50a are not converted into fluorescent lights but are regularly reflected as unconverted excitation light 51a by the phosphor 3 (at the emission angle θa) mainly in a direction symmetrical to the optical axis 100. Since θa=θc according to the mathematical formula 1, the unconverted excitation light group 51a travels in the opposite direction on an optical path of the excitation light 50c and enters the excitation light source 5c. Namely, reduction of output and life of the excitation light source 5c is caused by the unconverted excitation light 51a attributable to the excitation light source 5a.

Similarly, unconverted excitation light 51c which is not converted into fluorescent light by the phosphor 3 of the excitation light 50c emitted from the excitation light source 5c enters the excitation light source 5a, and the reduction of output and life of the excitation light source 5a occurs (not shown).

In FIG. 4(D), the excitation light 50b emitted from the excitation light source 5b of the excitation light source group 5 enters the excitation light irradiation region 30 through the above optical path. Some of the excitation lights 50b are not converted into fluorescent lights but are reflected as unconverted excitation light 51b by the phosphor 3. Since the incident angle of the excitation light 50b to the excitation light irradiation region 30 is θb=0, the unconverted excitation light 51b is regularly reflected in the same axial direction as the optical axis 100 to travel in the opposite direction on an optical path of the excitation light 50b, and thus to enter the excitation light source 5b. Namely, the reduction of output and life of the excitation light source 5b is caused by the unconverted excitation light 51b of the excitation light source 5b.

As described above, in FIG. 4, there is a problem that the unconverted excitation light of the excitation lights emitted from a plurality of the excitation light source groups enters the excitation light source group to increase a temperature of a light-emitting element, and thus to reduce the output and life of the excitation light source.

Next, the example 1 will be described. FIG. 1 is a view illustrating a portion of the light source device of the example 1. FIG. 1(A) is a configuration explanatory view, and FIGS. 1(B), 1(C), and 1(D) are configuration explanatory views illustrating improvement measures against incidence of the excitation light to the excitation light source as a problem. A definition of a local right side orthogonal coordinate system is the same as that in FIG. 4.

In FIG. 1(A), this example is similar to the description in FIG. 4 in that the excitation light emitted from the excitation light source group 5 is converted into fluorescent light and enters on the illumination optical system side. Note that, in this example, the excitation light source group 5 is arranged so that the excitation light group 50 emitted from the excitation light source group 5 enters the excitation light irradiation region 30 on the phosphor 3 asymmetrically to the optical axis 100. Namely, in the excitation lights 50a, 50b, and 50c generated respectively from the excitation light sources 5a, 5b, and 5c, and when the incident angles of the excitation lights 50a, 50b, and 50c to the optical axis 100 are respectively θa, θb, and θc, a mathematical formula 2 is established.

$$\theta a \ne \theta b \ne \theta c, \theta c, \ne \theta a (\theta a \ne 0, \theta b \ne 0, \theta c \ne 0) \quad \text{(mathematical formula 2)}$$

In FIG. 1(B), the excitation light 50a emitted from the excitation light source 5a of the excitation light source group 5 enters the excitation light irradiation region 30 through an optical path similar to that described in FIG. 4. Among those excitation lights, some excitation lights are not converted into fluorescent lights but are regularly reflected as the unconverted excitation light 51a on the phosphor 3 mainly in a direction symmetrical to the optical axis 100. According to the mathematical formula 2, the unconverted excitation light 51a travels on an optical path not overlapping the excitation lights 50b and 50c to be made substantially parallel to the optical axis 100 by the condensing lens 4, and thus to transmit through the dichroic mirror 7, whereby the unconverted excitation light 51a enters on the reflecting mirror 8 side. Accordingly, even if the unconverted excitation light 51a passes through between reflecting mirrors 8b and 8c or is reflected by the reflecting mirror 8, the unconverted excitation light 51a passes through between the excitation light sources 5b and 5c; therefore, the unconverted excitation light 51a does not enter the excitation light group 5.

In FIG. 1(C), the excitation light 50b emitted from the excitation light source 5b of the excitation light source group 5 enters the excitation light irradiation region 30 through an optical path similar to that described above. Some of the excitation lights 50b are not converted into fluorescent light but are regularly reflected as the unconverted excitation light 51b on the phosphor 3 mainly in the direction symmetrical to the optical axis 100. According to the mathematical formula 2, the unconverted excitation light 51b travels in the opposite direction on an optical path not overlapping the optical paths of the excitation lights 50a and 50c to become substantially parallel light with respect to the optical axis 100 through the condensing lens 4, and thus to transmit through the dichroic mirror 7, whereby the unconverted excitation light 51b enters on the reflecting mirror 8 side. Accordingly, even if the unconverted excitation light 51b passes through between the reflecting mirror 8a and 8b or is reflected by the reflecting mirror 8, the unconverted excitation light 51b passes through between the excitation light sources 5a and 5b; therefore, the unconverted excitation light 51b does not enter the excitation light source group 5.

In FIG. 1(D), the excitation light 50c emitted from the excitation light source 5c of the excitation light source group 5 enters the excitation light irradiation region 30 through an optical path similar to that described above. Some of the excitation lights 50c are not converted into fluorescent light but are regularly reflected as the unconverted excitation light 51c on the phosphor 3 mainly in the direction symmetrical to the optical axis 100. According to the mathematical formula 2, the unconverted excitation light group 51c travels in the opposite direction on an optical path not overlapping the excitation light 50a and the excitation light 50b to become substantially parallel light with respect to the optical axis 100 through the condensing lens 4, and thus to transmit through the dichroic mirror 7, whereby the unconverted excitation light group 51c enters on the reflecting mirror 8 side. Accordingly, even if the unconverted excitation light group 51c passes through the outside of the reflecting mirror 8a or is reflected by the reflecting mirror 8, the unconverted excitation light group 51c passes through the outside of the excitation light source 5a; therefore, the unconverted excitation light group 51c does not enter the excitation light source group 5.

As described above, in the excitation lights 50a, 50b, and 50c generated respectively from the excitation light sources 5a, 5b, and 5c, the unconverted excitation lights 51a, 51b, and 51c do not enter the excitation light source group 5; therefore, the output and life of the excitation light source group 5 can be improved.

Figure 2:
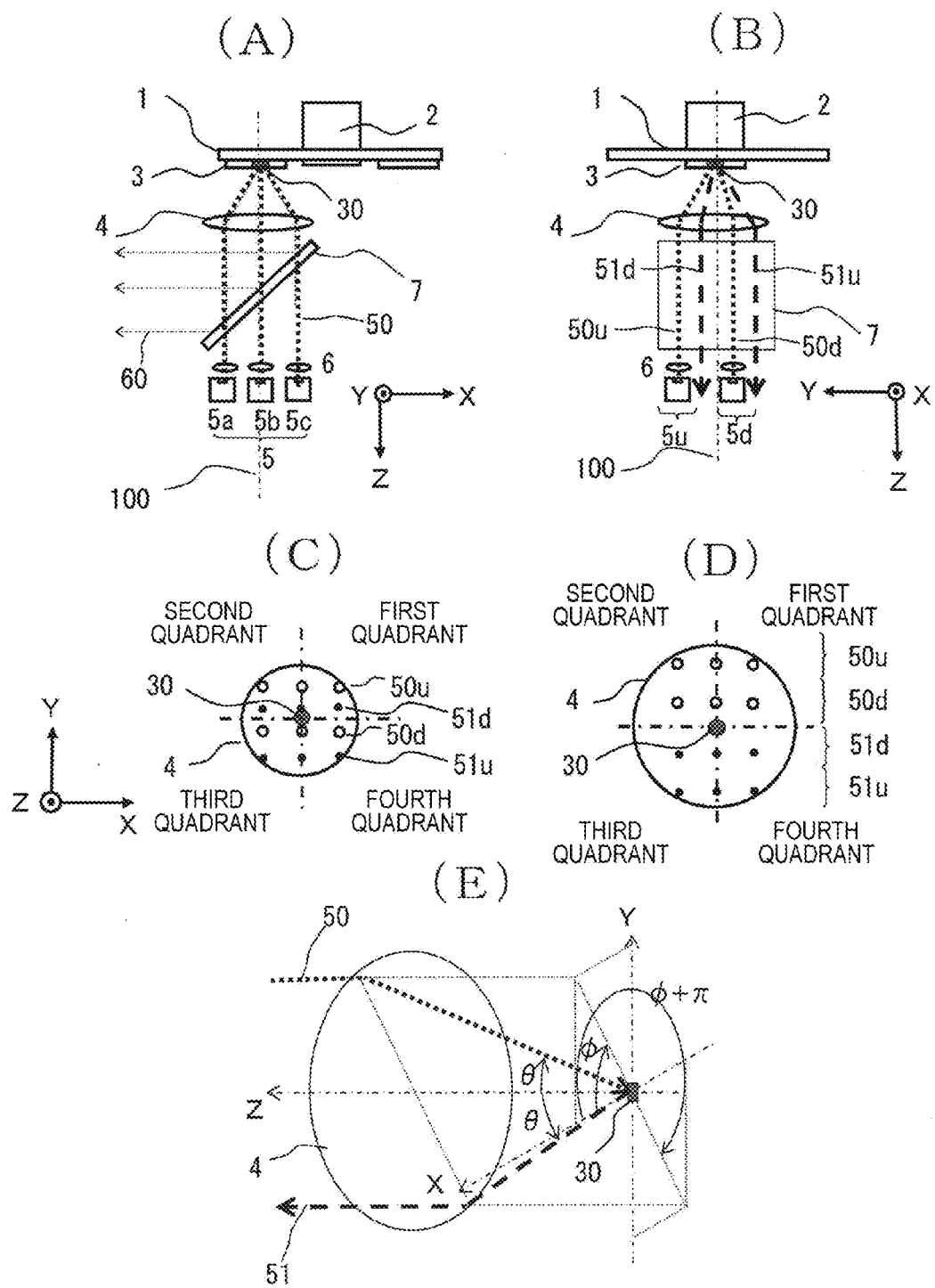
FIG. 2 is a view illustrating a portion of a light source device of an example 2.

Next, an example 2 will be described. FIG. 2 is a view illustrating a portion of a light source device of the example 2. Here, a local right side orthogonal coordinate system is introduced. In FIG. 2(A), an optical axis 100 is a Z axis, an axis parallel to a paper surface in a plane perpendicular to the Z axis is an X axis, and an axis extending from the rear side of the paper surface to the front side is a Y axis (note that, in FIG. 2(B), an axis extending from the rear side of the paper surface to the front side is the X axis, and in FIGS. 2(C) and 2(D), an axis extending from the rear side of the paper surface to the front side is the Z axis).

In FIG. 2, in an excitation light source group 5, three columns of excitation light sources are arranged in the X axis direction, and two rows of the excitation light sources are arranged in the Y axis direction. The arrangement of the excitation light sources in the X axis direction is symmetrical to the optical axis 100, and the arrangement of the excitation light sources in the Y axis direction is asymmetrical to the optical axis 100. In FIG. 2(A), an excitation light group 50 emitted from the excitation light source group 5 enters an excitation light irradiation region 30 on a phosphor 3 through an optical path similar to that described in FIG. 1 to be converted into fluorescent light 60, and thus to enter an illumination optical system (not shown) (for the sake of simplicity, a reflecting mirror 8 between a collimator lens group 6 and a dichroic mirror 7 is omitted). Some excitation light groups 50 are not converted into fluorescent light and are reflected as unconverted excitation light by the phosphor 3.

In FIG. 2(B), an unconverted excitation light group 51u not converted into fluorescent light by the phosphor 3 of an excitation light group 50u emitted from an excitation light source group 5u is regularly reflected mainly in a direction symmetrical to the optical axis 100 to be substantially parallel to the optical axis 100 through the condensing lens 4, and thus to transmit through the dichroic mirror 7. Since the excitation light source group 5 is located at a position where incident light of the excitation light group 50 entering the phosphor 3 is asymmetrical to the optical axis 100 in the Y axis direction, the unconverted excitation light group 51u passes through outside of an excitation light source group 5d.

Further, an unconverted excitation light group 51d not converted into fluorescent light by the phosphor 3 of an excitation light group 50d emitted from an excitation light source group 5d is regularly reflected mainly in a direction symmetrical to the optical axis 100 to be substantially parallel to the optical axis 100 through the condensing lens 4, and thus to transmit through the dichroic mirror 7. Since the excitation light source group 5 is located at a position where incident light of the excitation light group 50 entering the phosphor 3 is asymmetrical to the optical axis 100 in the Y axis direction, the unconverted excitation light group 51d passes through between the excitation light source group 5u and the excitation light source group 5d.

As described above, since the unconverted excitation light groups 51u and 51d not converted into fluorescent light of the excitation light groups 50u and 50d generated respectively from the excitation light source groups 5u and 5d do not enter the excitation light source group 5, the output and life of the excitation light source group 5 can be improved.

FIG. 2(C) is a projection view in which an X-Y cross section is viewed from the direction (Z axis direction) of the optical axis 100. In the excitation light group 50 emitted from the excitation light source group 5, since the incident light entering the phosphor 3 is asymmetrical to the Y axis direction with the excitation light irradiation region 30 as the center, the unconverted excitation light group 51 does not enter the excitation light source group 5. Since the excitation light group 50 enters the excitation light irradiation region 30 from all regions of four quadrants with the excitation light irradiation region 30 as a center, the condensing lens 4 can be suppressed to a compact size.

FIG. 2(D) is an example of incidence of the excitation light group 50 from the two quadrants (first quadrant and second quadrant) of the four quadrants with the excitation light irradiation region 30 as a center. Since the incident light of the excitation light group 50 entering the phosphor 3 is asymmetrical to the Y axis direction with the excitation light irradiation region 30 as a center, the unconverted excitation light group 51 can be prevented from entering the excitation light source group 5. However, since the excitation light group 50 enters the excitation light irradiation region 30 from a position away from the excitation light irradiation region 30 in the Y axis direction, the condensing lens 4 is increased in size. Accordingly, it is preferable that the excitation light group 50 enters from all the four quadrants with the excitation light irradiation region 30 as a center.

In FIG. 2(E), the condition for preventing the incidence of the unconverted excitation light group 51 to the excitation light source group 5 is represented by using a polar coordinate system with the excitation light irradiation region 30 as a center. An elevation angle from the Z axis direction is θ, and an azimuth angle in an XY coordinate is φ. When the excitation light group 50 enters from the Z axis direction and enters the excitation light irradiation region 30 at an incident angle with the elevation angle θ and the azimuth angle φ through the condensing lens 4, the unconverted excitation light group 51 emits at an emission angle with the elevation angle θ and the azimuth angle φ+180°. Accordingly, when in the incident angle of arbitrary excitation light, the elevation angle is θm, and the azimuth angle is φm, and in the incident angle of another arbitrary excitation light, the elevation angle is θn, and the azimuth angle is φn, a mathematical formula 3 or a mathematical formula 4 is established as the condition for preventing incidence of the unconverted excitation light group 51 to the excitation light source group 5.

$$\theta n \neq \theta m (\theta m \neq 0, \theta n \neq 0) \quad \text{(mathematical formula 3)}$$

$$\theta n \neq \theta m + 180° (\theta m \neq 0, \theta n \neq 0) \quad \text{(mathematical formula 4)}$$

Namely, the excitation light group 50 may enter the excitation light irradiation region 30 so that the entering and exiting lights are prevented from overlapping each other by shifting the elevation angle or the azimuth angle. Since a distance between the excitation light source group 5 and the excitation light irradiation region 30 is sufficiently long, the incidence of the unconverted excitation light group 51 to the excitation light source group 5 can be prevented by shifting each excitation light incident angle by not less than 2 degrees. Namely, there may be no pair of excitation lights in which a mathematical formula 5 is established.

$$\theta m-2°\le\theta n\le\theta m+2°, \text{ and } \Phi m+178°\le\Phi m\le\Phi m+182°$$ (mathematical formula 5)

Figure 5:
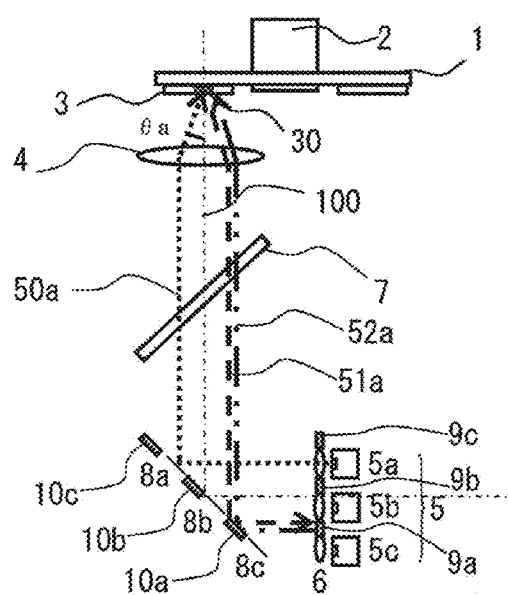
FIG. 5 is a view illustrating a portion of a light source device of an example 3.
Figure 5:
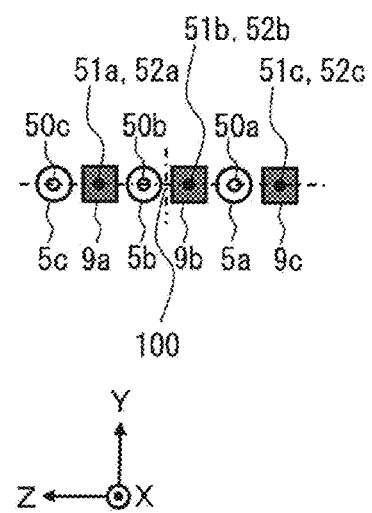

Next, an example 3 will be described. FIG. 5 is a view illustrating a portion of a light source device of the example 3. Although a definition of a local right side orthogonal coordinate system in FIG. 5(A) is the same as that in FIG. 4, FIG. 5(B) is a projection view in which the excitation light source group 5 is viewed from an X axis positive direction of FIG. 5(A).

Although a main arrangement of constituent components in FIG. 5(A) is similar to that in FIG. 1, FIG. 5(A) is different from FIG. 1 in that a reflecting mirror 10c is disposed outside a reflecting mirror 8a, a reflecting mirror 10b is disposed between the reflecting mirror 8a and a reflecting mirror 8b, the reflecting mirror 10a is disposed between the reflecting mirror 8b and a reflecting mirror 8c, a reflecting mirror 9c is disposed outside an excitation light source 5a, a reflecting mirror 9b is disposed between the excitation light source 5a and an excitation light source 5b, and a reflecting mirror 9a is disposed between the excitation light source 5b and an excitation light source 5c.

A tangential direction of a reflecting mirror group 10 is a direction in which the X axis is rotated at about 45 degrees clockwise with respect to the Y axis direction so that the unconverted excitation light group 51 reflects toward the excitation light source group 5. A reflecting mirror group 9 is arranged vertically to a traveling direction of the unconverted excitation light group 51 so that the unconverted excitation light group 51 reflects in an direction opposite to the travelling direction.

The unconverted excitation light 51a having travelled in an optical path as in the description of FIG. 1(A) is reflected by the reflecting mirror 10a and thereafter reflected by the reflecting mirror 9a. The light reflected by a reflecting mirror to travel in the opposite direction is referred to as a reflected unconverted excitation light 52 to be distinguished from the unconverted excitation light 51.

Reflected unconverted excitation light 52a travels in the opposite direction on an optical path of the unconverted excitation light 51a and enters the excitation light irradiation region 30 again. The unconverted excitation light 51b is reflected by the reflecting mirror 10b and thereafter reflected by the reflecting mirror 9b. The reflected unconverted excitation light 52b travels an optical path of the unconverted excitation light 51b in the opposite direction and enters the excitation light irradiation region 30 again (not shown). The unconverted excitation light 51c is reflected by the reflecting mirror 10c and thereafter reflected by the reflecting mirror 9c. The reflected unconverted excitation light 52c travels in the opposite direction on an optical path of the unconverted excitation light 51c and enters the excitation light irradiation region 30 again (not shown). The reflected unconverted excitation light 52 having entered the excitation light irradiation region 30 is converted into the fluorescent light by the phosphor 3 and enters on the illumination optical system side. The reflecting mirror group 10 and a reflecting mirror group 8 for reflecting excitation light may be used in common.

Figure 6:
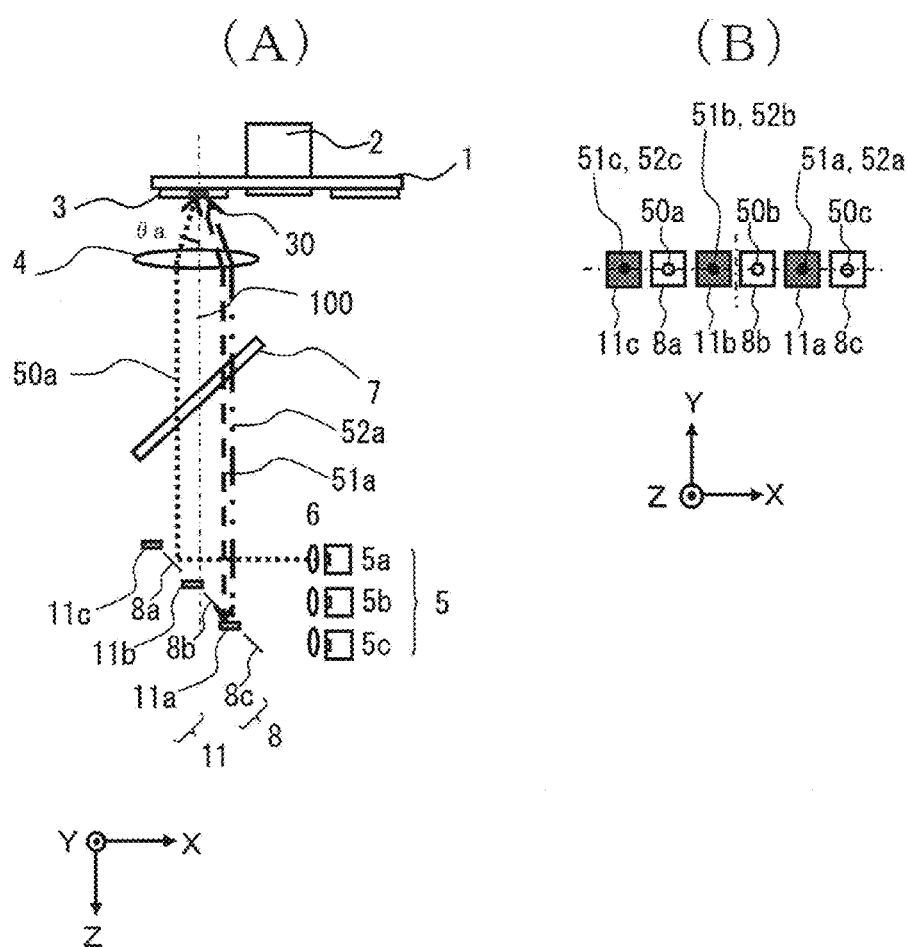
FIG. 6 is a view illustrating a portion of a light source device of an example 4.

Next, an example 4 will be described. FIG. 6 is a view illustrating a portion of a light source device of the example 4. Although a definition of a local right side orthogonal coordinate system in FIG. 6(A) is the same as that in FIG. 4, FIG. 6(B) is a projection view in which reflecting mirror groups 8 and 11 are viewed from a Z axis positive direction of FIG. 6(A).

Although a main arrangement of constituent components in FIG. 6(A) is similar to that in FIG. 1, FIG. 6(A) is different from FIG. 1 in that a reflecting mirror 11c is disposed outside a reflecting mirror 8a, a reflecting mirror 11b is disposed between the reflecting mirror 8a and a reflecting mirror 8b, and the reflecting mirror 11a is disposed between the reflecting mirror 8b and a reflecting mirror 8c. A reflecting mirror group 11 is arranged vertically to a travelling direction of an unconverted excitation light group 51 so that the unconverted excitation light group 51 reflects in a direction of an excitation light irradiation region 30.

Reflected unconverted excitation light 51a having travelled in an optical path as in the description of FIG. 1(A) is reflected by the reflecting mirror 11a to travel as a reflected converted excitation light 52a in the opposite direction on an optical path of the unconverted excitation light 51a, and thus to enter the excitation light irradiation region 30 again. The unconverted excitation light 51b is reflected by the reflecting mirror 11b. Reflected converted excitation light 52b travels in the opposite direction on an optical path of the unconverted excitation light 51b and enters the excitation light irradiation region 30 again (not shown). The unconverted excitation light 51c is reflected by the reflecting mirror 11c. The reflected unconverted excitation light 52c travels in the opposite direction on an optical path of the unconverted excitation light 51c and enters the excitation light irradiation region 30 again (not shown). A reflected unconverted excitation light group 52 having entered the excitation light irradiation region 30 is converted into fluorescent light by the phosphor 3 and enters on the illumination optical system side.

In the example 4, since the reflecting mirror 8 for reflecting excitation light and the reflecting mirror group 11 for reflecting unconverted excitation light can be arranged collectively, the efficiency in manufacture of parts is good, and the cost can be suppressed.

Figure 7:
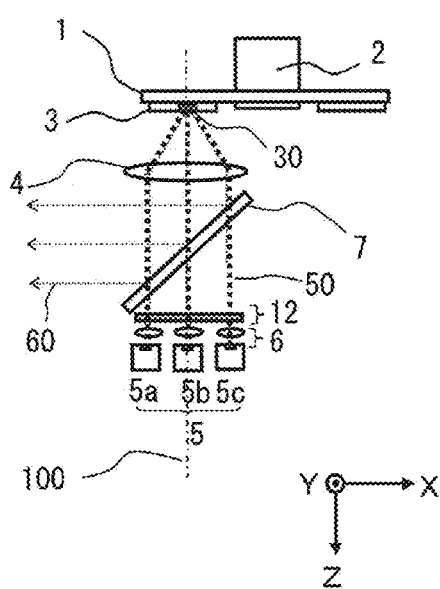
FIG. 7 is a view illustrating a portion of a light source device of an example 5.
Figure 7:
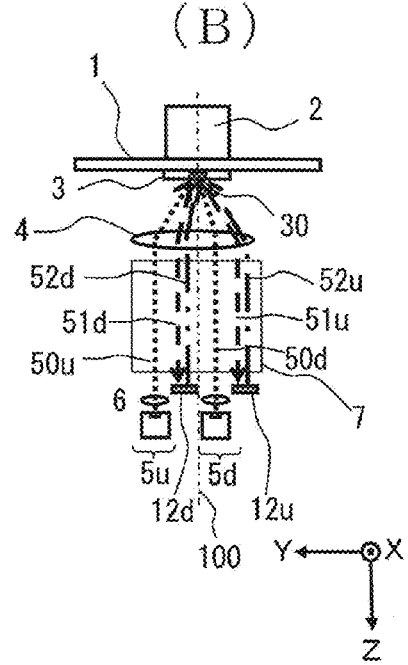
Figure 7:
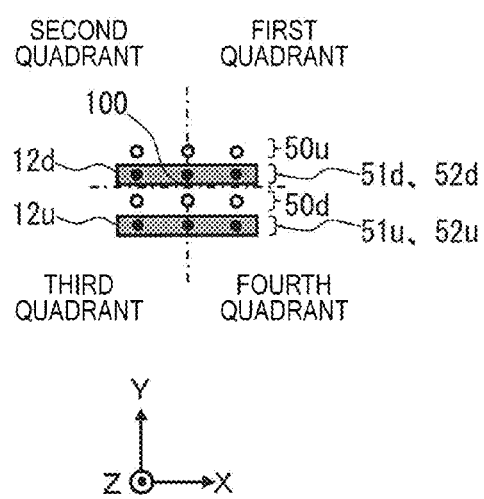
Figure 7:
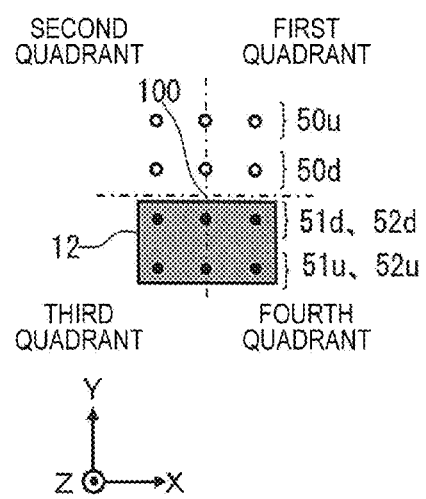

Next, an example 5 will be described. FIG. 7 is a view illustrating a portion of a light source device of an example 5. A coordinate system of FIG. 7 is similar to the coordinate system in FIG. 2.

Although a main arrangement of constituent components in FIG. 7 is similar to that in FIG. 2, FIG. 7 is different from FIG. 2 in that a reflecting mirror 12u is disposed outside an excitation light source group 5d vertically to a travelling direction of an unconverted excitation light group 51u, and a reflecting mirror 12d is disposed between an excitation light source group 5u and an excitation light source group 5d vertically to a travelling direction of an unconverted excitation light group 51d.

The unconverted excitation light groups 51u and 51d reflect the reflecting mirrors 12u and 12d, respectively to travel as reflected unconverted excitation light groups 52u and 52d in the opposite direction on optical paths of the unconverted excitation light groups 51u and 51d, respectively, and thus to enter an excitation light irradiation region 30 again. A reflected unconverted excitation light group 52 having entered the excitation light irradiation region 30 is converted into fluorescent light by a phosphor 3 and enters the illumination optical system side.

FIG. 7(C) is a projection view in which a reflecting mirror 12 is viewed from a Z axis positive direction of FIG. 7(A). Since light of the excitation light group 50 emitted from the excitation light source group 5 and entering the phosphor 3 is asymmetrical in the Y axis direction with the optical axis 100 as a center, an unconverted excitation light group 51 does not enter an excitation light source group 5. The reflecting mirror group 12 is arranged in a range in which the unconverted excitation light group 51 is captured and thereby reflects the unconverted excitation light group 51, and the unconverted excitation light group 51 can enter the phosphor 3 again as the reflected unconverted excitation light group 52. In this arrangement, the reflecting mirror 12 has a strip shape elongated in the X axis direction.

Although FIG. 7(D) is a projection view in which the reflecting mirror 12 is viewed from the Z axis positive direction of FIG. 7(A), in this example FIG. 7(D) shows an example in which the excitation light group 50 enters two quadrants (a first quadrant and a second quadrant) of four quadrants with the optical axis 100 as a center.

As in the description of FIG. 2(D), since in this arrangement the incident light of the excitation light group 50 entering the phosphor 3 is asymmetrical to the Y axis direction with the optical axis 100 as a center, the unconverted excitation light group 51 can be prevented from entering the excitation light source group 5. Note that, since the excitation light group 50 enters the excitation light irradiation region 30 from a position away from the excitation light irradiation region 30 in the Y axis direction, the condensing lens 4 is increased in size in comparison with FIG. 7(C). However, since the unconverted excitation light groups 51*d* and 51*u* gather at two quadrants (a third quadrant and a fourth quadrant) symmetrical to the excitation light group 50 with respect to the optical axis 100, the single reflecting mirror 12 may be provided.

In FIGS. 7(C) and 7(D), when a range in which the unconverted excitation light group 51 can be captured is satisfied, the reflecting mirror group 12 may be divided. The Z axis direction position of the reflecting mirror group 12 is provided closer to the excitation light source group 5 side than the dichroic mirror 7 and may be any position as long as it is a position where the unconverted excitation light groups 51*d* and 51*u* can be captured. As in FIG. 2, although the reflecting mirror 8 between the collimator lens group 6 and the dichroic mirror 7 is omitted in this example, the reflecting mirror group 12 for reflecting unconverted excitation light may be provided closer to the dichroic mirror 7 than the reflecting mirror 8 or may be provided closer to the excitation light source group 5.

Next, there will be described preferred embodiments (examples 6 and 7) in which a semiconductor laser or the like in which a divergence angle of emission light is not uniform, and a direction in which the divergence angle is maximum is substantially vertical to a direction in which the divergence angle is minimum is used as an example of the excitation light source.

Figure 8:
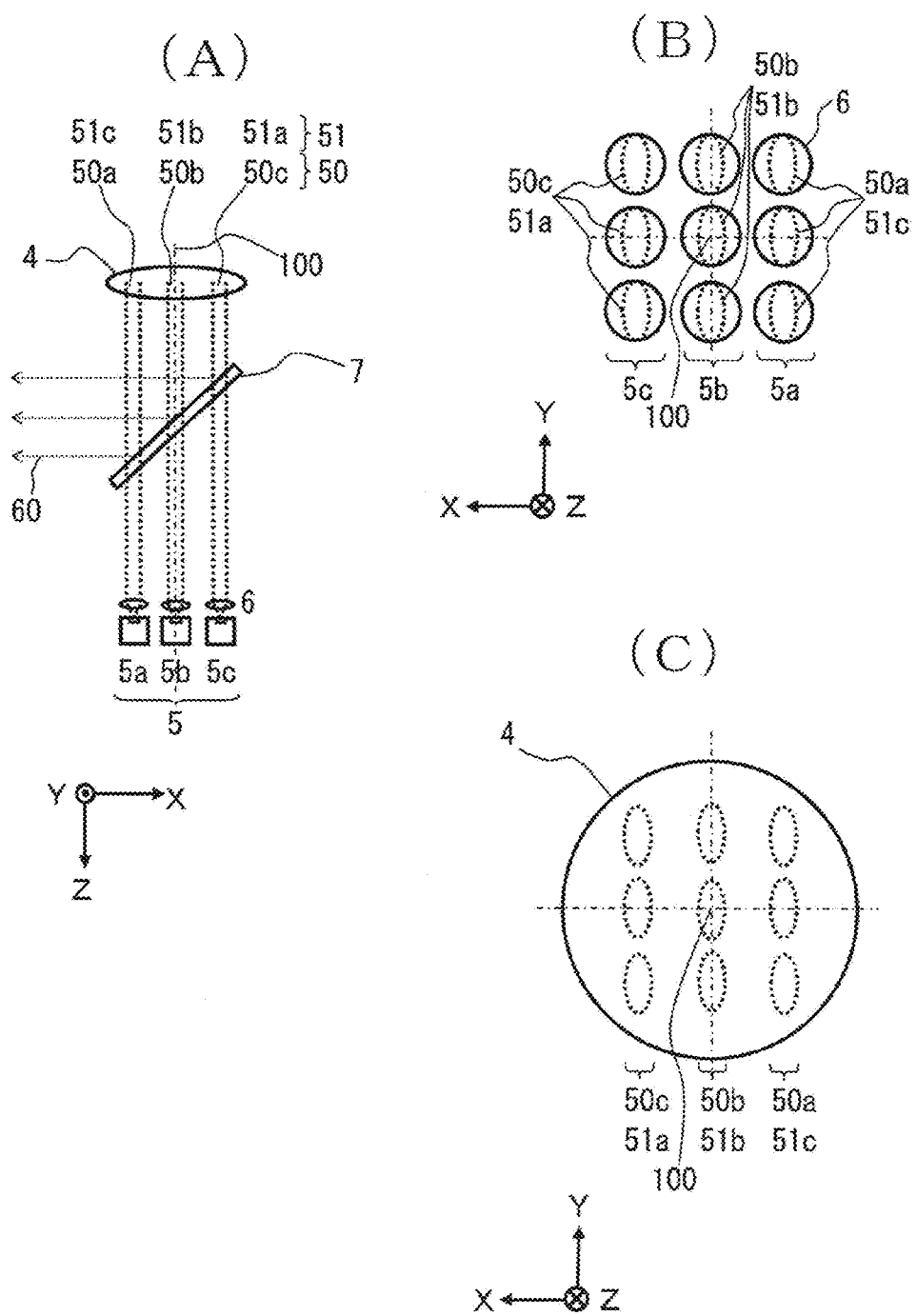
FIG. 8 is a view illustrating a portion of a light source device considered as a problem of the example 6.

FIG. 8 is a view illustrating a portion of a light source device considered as a problem of the example 6, FIG. 8(A) is a view for explaining a configuration, FIG. 8(B) is a view illustrating excitation light source arrangement and a luminous flux cross-sectional shape of excitation light, and FIG. 8(C) is a view illustrating a luminous flux distribution of excitation light on a condensing lens. A definition of a local right side coordinate system of FIG. 8(C) is the same as that in FIG. 4.

In FIG. 8A, in the excitation light source group 5, three columns of excitation light sources are arranged in the X axis direction, and three rows of the excitation light sources are arranged in the Y axis direction. The arrangement of the excitation light source groups in the X axis direction and the Y axis direction is symmetrical to the optical axis 100. In FIG. 8(A), the components above the condensing lens 4 are omitted.

FIG. 8(B) is a projection view in which the collimator lens group 6 is viewed from a Z axis negative direction. The excitation light source group 5 and the collimator lens group 6 are arranged at equal intervals in the X axis direction and the Y axis direction, respectively, at the closest intervals determined from restriction of an outer shape of the excitation light source group 5 or the collimator lens group 6 to suppress each size of the condensing lens 4 and the dichroic mirror 7 to a compact size. When each outer shape of the excitation light source and the collimator lens is a circular shape, an X axis direction interval and a Y axis direction interval are equal to each other.

In the excitation light source group 5, the divergence angle of emission light is not uniform, and the direction in which the divergence angle is maximum is substantially vertical to the direction in which the divergence angle is minimum, a luminous flux cross-sectional shape of the excitation light group 50 which is made parallel light by the collimator lens group 6 is a substantially elliptical shape in which the direction in which the divergence angle is maximum is a long axis direction. This drawing shows a case where the excitation light source group 5 is arranged so that the Y axis direction corresponds to the direction in which the divergence angle of the emission light of the excitation light group 50 is maximum.

FIG. 8(C) is a projection view in which the condensing lens 4 is viewed from the Z axis negative direction. A distribution of the excitation light group 50 on the condensing lens 4 is similar to that at the time of emission in FIG. 8(B). Since the excitation light group 50 having an elliptical luminous flux cross-sectional shape whose long axis corresponds to the Y axis direction is arranged at equal intervals in the X axis direction and the Y axis direction with respect to the circular condensing lens 4, there is provided a distribution in which many regions through which a luminous flux does not pass exist in a gap of the luminous flux in the X axis direction, and thus it cannot be said that the effective range of the lens is utilized effectively.

Figure 9:
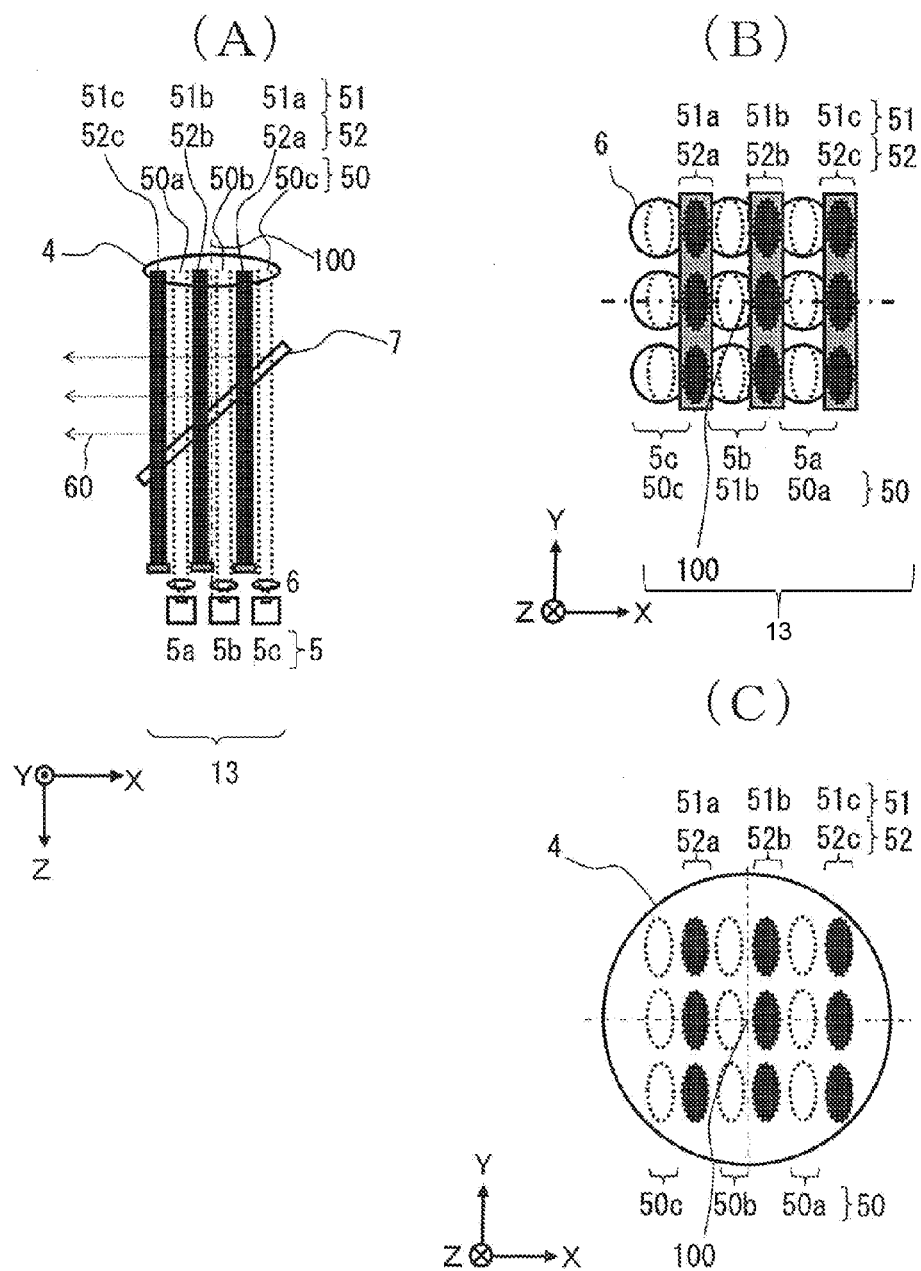
FIG. 9 is a view illustrating a portion of the light source device of the example 6.

Next, the example 6 will be described. FIG. 9 is a view illustrating a portion of a light source device of the example 6. FIG. 9(A) is a configuration explanatory view. In this example, since the light of the excitation light group 50 emitted from the excitation light source group 5 and entering the phosphor 3 is asymmetrical to the Y axis direction with the optical axis 100 as a center, each optical path of the unconverted excitation light group 51 does not overlap each optical path of the excitation light group 50, and the unconverted excitation light group 51 returns to a position where the light does not enter the excitation light source group 5. A reflecting mirror 13 is disposed vertically to the unconverted excitation light group 51 at a position closer to the excitation light source group 5 side than the dichroic mirror 7 where the unconverted excitation light group 51 enters. Accordingly, the unconverted excitation light group 51 is reflected by the reflecting mirror 13 and travels as reflected unconverted excitation light group 52 in the opposite direction on the optical path of the unconverted excitation light group 51 and enters an excitation light irradiation region again (not shown). The reflected unconverted excitation light group 52 having entered the excitation light irradiation region again is converted into fluorescent light by a phosphor and enters on the illumination optical system side (not shown).

FIG. 9(B) is a projection view in which a reflecting mirror group 13 is viewed from the Z axis negative direction. Since the unconverted excitation light group 51 is the excitation light group 50 regularly reflected symmetrically to the optical axis 100 on the phosphor, the luminous flux cross-sectional shape of the unconverted excitation light group 51 is congruent with the luminous flux cross-sectional shape of the excitation light group 50 and is an ellipse in which the Y axis direction corresponds to the long axis direction.

Since the reflected unconverted excitation light group 52 is the unconverted excitation light group 51 regularly reflected on the reflecting mirror group 13 arranged vertically to the unconverted excitation light group 51, the luminous flux cross-sectional shape of the reflected unconverted excitation light group 52 is congruent with the luminous flux cross-sectional shape of the unconverted excitation light group 51 and is an ellipse in which the Y axis direction corresponds to the long axis direction. In this arrangement, the shape of the reflecting mirror 9 is a strip shape elongated in the Y axis direction. Note that if a range in which the unconverted excitation light group 51 is captured is satisfied, the reflecting mirror group 13 may be divided.

FIG. 9(C) is a projection view in which the condensing lens 4 is viewed from the Z axis negative direction. The distribution of the excitation light group 50 on the condensing lens 4 is similar to that at the time of emission in FIG. 9(B). The excitation light group 50 having an elliptical luminous flux cross-sectional shape whose long axis corresponds to the Y axis direction is arranged at equal intervals in the X axis direction and the Y axis direction with respect to the circular condensing lens 4, and the unconverted excitation light groups 51*a*, 51*b*, and 51*c* and the reflected unconverted excitation light groups 52*a*, 52*b*, and 52*c* overlapping these unconverted excitation light groups distribute in a gap in the X axis direction. Since the excitation light and the reflected unconverted excitation light are alternately arranged in the Y axis direction, there are a few regions through which a luminous flux does not pass, and the effective range of the lens can be more effectively utilized in comparison with the case in FIG. 8.

Figure 10:
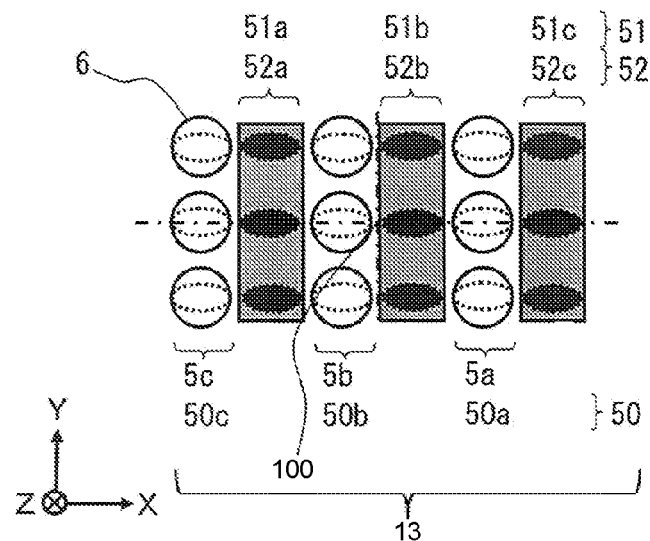
FIG. 10 is a view illustrating a variation of FIG. 9.
Figure 10:
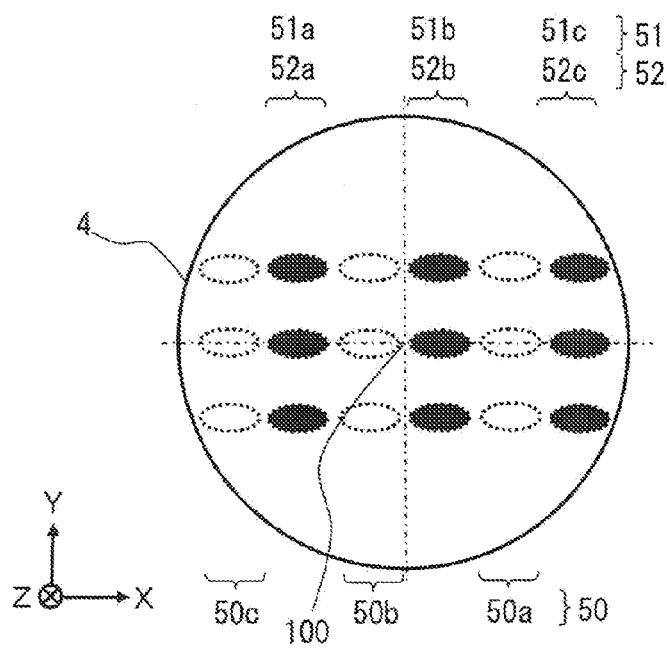

FIG. 10 is a view showing a variation of FIG. 9. In this example, the excitation light source group 5 is arranged so that the X axis direction corresponds to a direction in which the divergence angle of the emission light of the excitation light group 50 is maximum. FIG. 10(A) is a projection view in which the reflecting mirror group 13 of FIG. 9(A) is viewed from the Z axis negative direction.

Although in the Y axis direction the excitation light source 5 and the collimator lens group 6 are arranged at equal intervals at the closest intervals determined from the restriction of an outer shape of the excitation light source 5 or the collimator lens group 6, in the X axis direction the excitation light source 5 and the collimator lens group 6 are arranged at intervals larger than the closet intervals determined from the restriction of the outer shape because there is required to provide a gap through which the unconverted excitation light group 51 and the reflected unconverted excitation light group 52 overlapping the unconverted excitation light group 51 pass and in which the reflecting mirror group 13 is arranged. Consequently, an area occupied by the excitation light source group 5 is increased. In this arrangement, although the shape of the reflecting mirror group 13 is a strip shape elongated in the Y axis direction, the X axis direction corresponds to the long axis direction of an ellipse showing a luminous flux cross-sectional shape of the unconverted excitation light group 51 and the reflected unconverted excitation light group 52 overlapping the unconverted excitation light group 51; therefore, the width in the X axis direction is increased.

FIG. 10(B) is a projection view in which the condensing lens 4 is viewed from the Z axis negative direction in the arrangement in FIG. 10(A). The distribution of the excitation light group 50 on the condensing lens 4 is similar to that at the time of emission in FIG. 10(A). Since the long axis direction of an ellipse showing the luminous flux cross-sectional shape of the excitation light group 50, the unconverted excitation light group 51, and the reflected unconverted excitation light group 52 overlapping the unconverted excitation light group 51 corresponds to the X axis direction of the circular condensing lens 4, the effective range required in the X axis direction is expanded, so that the condensing lens 4 is increased. Many ranges through which a luminous flux does not pass exist in a gap of each luminous flux and upward and downward of a luminous flux range in the Y axis direction, and it cannot be said that the effective range of the lens is effectively utilized.

Accordingly, when the arrangement of the excitation light source group 5 in the X axis direction is asymmetrical to the optical axis 100, it is preferable that the excitation light source group 5 is arranged so that the direction in which the divergence angle of the emission light of each of the excitation light source group 5 is maximum corresponds to the Y axis direction. Namely, it is preferable that the excitation light sources are arranged so that a direction of an axis shifting the excitation light with respect to the optical axis so that the excitation light is asymmetrical to the optical axis 100 is vertical to a direction in which the divergence angle of the emission light from the excitation light source is maximum.

In FIGS. 9 and 10, although an example in which the reflecting mirror group 13 is installed is shown, the luminous flux cross-sectional shapes and distributions of the excitation light and the unconverted excitation light are not changed even in the case where the reflecting mirror group 13 is not installed, and the arrangement of the excitation light sources is just asymmetrical to the optical axis 100; therefore, the same can be said.

Figure 11:
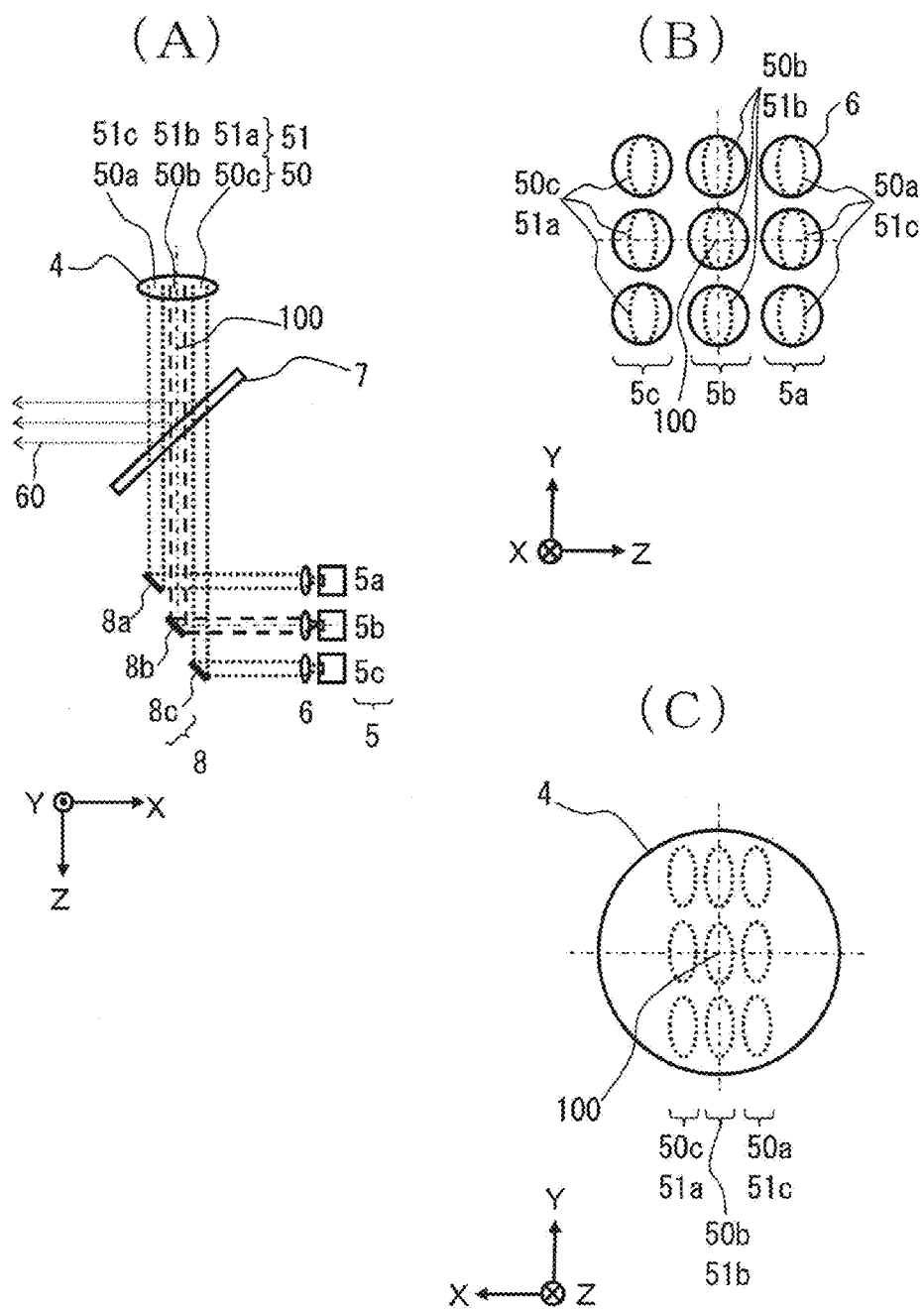
FIG. 11 is a view illustrating a portion of a light source device considered as a problem of an example 7.

FIG. 11 is a view showing a portion of a light source device considered as a problem of an example 7. FIG. 11(A) is a configuration explanatory view. FIG. 11(B) is a view illustrating the arrangement of the excitation light sources and the luminous flux cross-sectional shape of the excitation light. FIG. 11(C) is a view illustrating a luminous flux distribution of the excitation light on a condensing lens. The definition of the local right side coordinate system is similar to that in FIG. 4.

In FIG. 11, in an excitation light source group 5, three columns of excitation light sources are arranged in the Z axis direction, and three rows of the excitation light sources are arranged in the Y axis direction. The arrangement of the excitation light source groups in the Z axis direction and the Y axis direction is symmetrical to the optical axis 100. In FIG. 11(A), the components above the condensing lens 4 are omitted.

A gap in the Y axis direction between the luminous fluxes of an excitation light group 50 having passed through a collimator lens group 6 is smaller than the width of the luminous flux in the Y axis direction of each luminous flux of the excitation light group 50. The normal direction of a reflecting mirror group 8 faces a direction in which the X axis is rotated at about 45 degrees clockwise with respect to the Y axis direction. The reflecting mirror group 8 is arranged so that each reflecting mirror is shifted in the Z axis direction to such an extent that after the excitation light group 50 reflects the reflecting mirror group 8, a gap between the luminous fluxes in the X axis direction is smaller than the width of the luminous flux in the X axis direction. Consequently, an interval between the luminous fluxes in the X axis direction is smaller than the interval between the luminous fluxes in the Y axis direction.

FIG. 11(B) is a projection view in which the collimator lens group 6 is viewed from the X axis negative direction. The excitation light source group 5 and the collimator lens group 6 are arranged at equal intervals in the X axis direction and the Y axis direction, respectively, at the closest intervals determined from restriction of an outer shape of the excitation light source group 5 or the collimator lens group 6 to suppress each size of the condensing lens 4 and the dichroic mirror 7 to a compact size. When each outer shape of the excitation light source and the collimator lens is a circular shape, the X axis direction interval and the Y axis direction interval are equal to each other.

In the excitation light source group 5, the divergence angle of the emission light is not uniform, and a direction in which the divergence angle is maximum is substantially vertical to a direction in which the divergence angle is minimum; therefore, a luminous flux cross-sectional shape of the excitation light group 50 which is made parallel light by the collimator lens is a substantially elliptical shape in which the direction in which the divergence angle is maximum is the long axis direction. This drawing shows a case where the excitation light source group 5 is arranged the Y axis direction corresponds to the direction in which the divergence angle of the emission light of the excitation light group 50 is maximum.

FIG. 11(C) is a projection view in which the condensing lens 4 is viewed from the Z axis negative direction. Since the reflecting mirror group 8 is arranged so that each reflecting mirror is shifted in the Z axis direction to such an extent that after the excitation light group 50 reflects the reflecting mirror 8, the gap between the luminous fluxes in the X axis direction is smaller than the width of the luminous flux in the X axis direction, in the distribution of the excitation light group 50 on the condensing lens 4, the interval of the excitation light group 50 is smaller than that at the time of emission in FIG. 8(B), and a luminous flux passing range in the X axis direction is narrowed. Thus, the size of the condensing lens 4 can be reduced in comparison with the case where no reflecting mirror is used. Since a distribution in which a gap is small can be provided in the X axis direction and the Y axis direction with respect to the circular condensing lens 4, the effective range of the lens can be effectively utilized.

However, in this arrangement, in order to prevent the reduction of the output and life of the excitation light source group 5 due to the incidence of the unconverted excitation light group 51 to the excitation light source group 5, even if the excitation light source group 5 is arranged so that the excitation light group 50 emitted from the excitation light source group 5 enters the excitation light irradiation region of a phosphor asymmetrically to the X axis direction with respect to the optical axis 100, the gap in the X axis direction between the luminous fluxes of the excitation light group 50 in a range from the reflecting mirror 8 to the phosphor is smaller than the width of the luminous fluxes in the X axis direction of the excitation light group 50; therefore, the luminous fluxes of the unconverted excitation light group 51 and the luminous fluxes of the excitation light group 50 overlap each other, and they cannot be separated completely.

Even if the excitation light source group 5 is arranged so that the excitation light group 50 enters the excitation light irradiation region of the phosphor asymmetrically to the Y axis direction with respect to the optical axis 100, the gap in the Y axis direction between the luminous fluxes of the excitation light group 50 in a range from the collimator lens group 6 to the phosphor is smaller than a luminous width in the Y axis direction of the excitation light group 50; therefore, the luminous fluxes of the unconverted excitation light group 51 and the luminous fluxes of the excitation light group 50 overlap each other, they cannot be separated completely. Accordingly, it is not possible to solve such a problem that at least a portion of the unconverted excitation light group 51 enters the excitation light source group 5 to cause the reduction of the output and life of the excitation light source group 5.

Thus, there will be described a method of reducing return light of unconverted excitation light to an excitation light source and improving an efficiency of converting excitation light into fluorescent light while reducing a width between luminous fluxes in the X axis direction by using a reflecting mirror.

Figure 12:
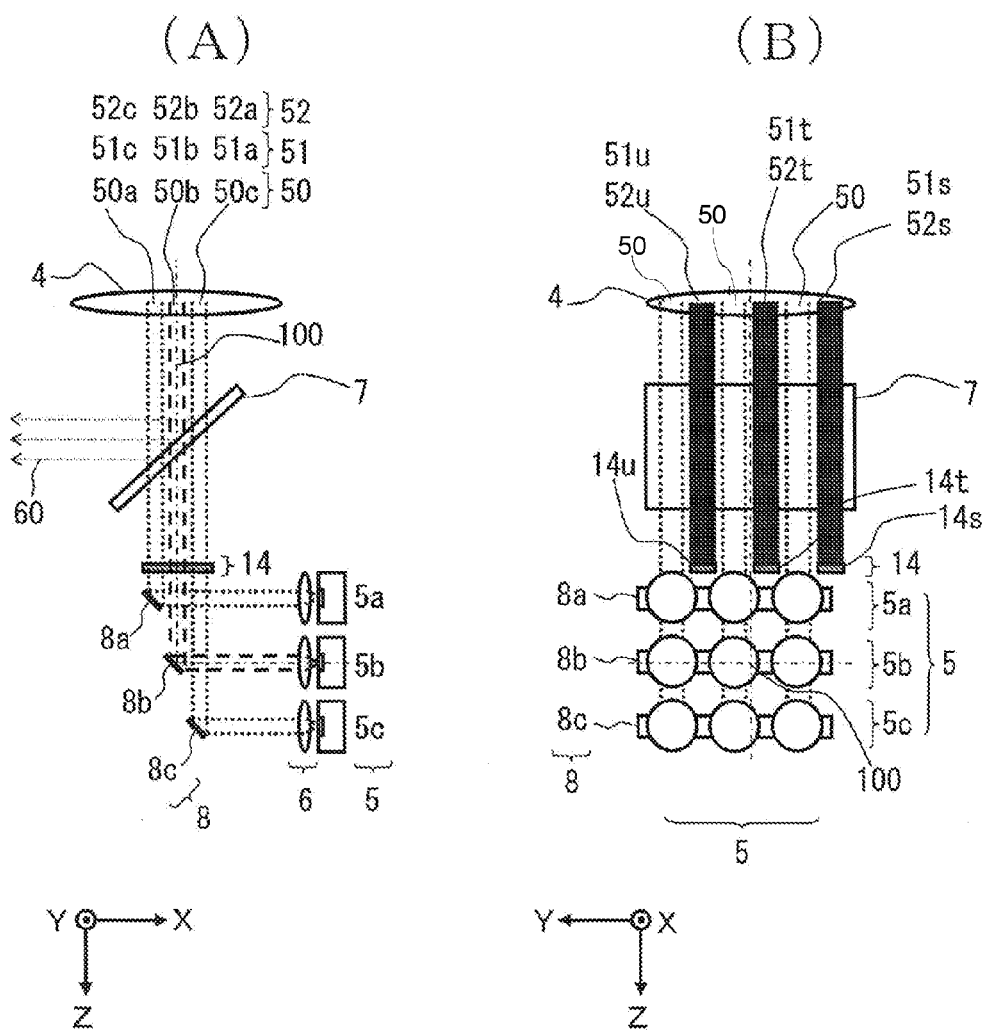
FIG. 12 is a view illustrating a portion of the light source device of the example 7.
Figure 13:
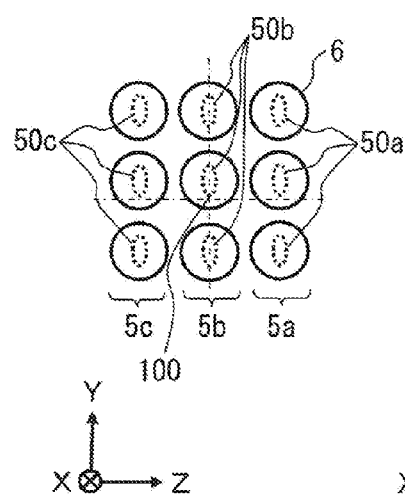
FIG. 13 is a view illustrating a portion of the light source device of the example 7.
Figure 13:
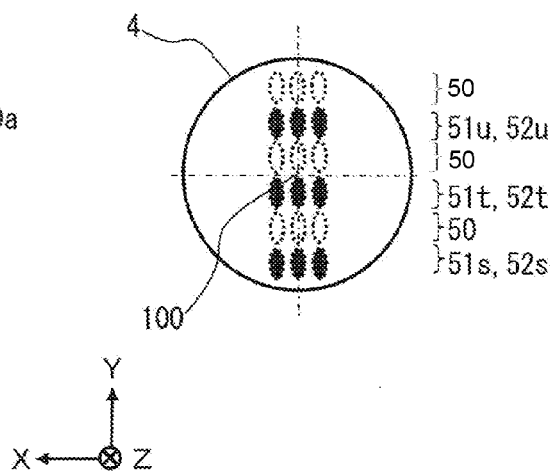
Figure 13:
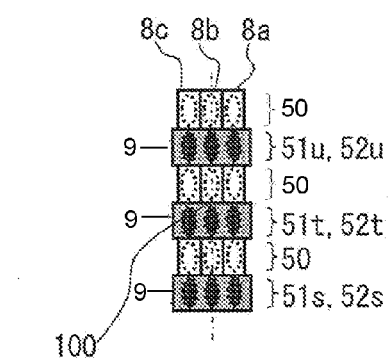
Figure 13:
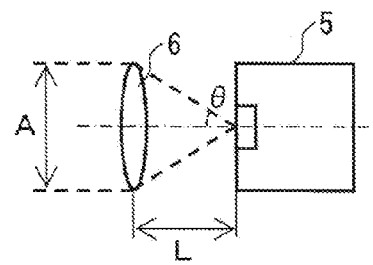

FIGS. 12 and 13 are views illustrating a portion of the light source device of the example 7. The definition of the local right side coordinate system is the same as that in FIG. 4. In FIGS. 12 and 13, in the excitation light source group 5, three columns of excitation light sources are arranged in the Z axis direction, and three rows of the excitation light sources are arranged in the Y axis direction. The arrangement of the excitation light source group in the Z axis direction is symmetrical to the optical axis 100, and the arrangement of the excitation light source group in the Y axis direction is asymmetrical to the optical axis 100.

In FIG. 12(A), the normal direction of the reflecting mirror group 8 faces a direction in which the X axis is rotated at about 45 degrees clockwise with respect to the Y axis direction. The reflecting mirror group 8 is arranged so that each reflecting mirror is shifted in the Z axis direction to such an extent that after the excitation light group 50 reflects the reflecting mirror 8, the gap between the luminous fluxes in the X axis direction is smaller than the width of the luminous flux in the X axis direction. Consequently, an interval between the luminous fluxes in the X axis direction is smaller than the interval between the luminous fluxes in the Y axis direction.

FIG. 12(B) is a view in which FIG. 12(A) is viewed from the X axis positive direction. Since the excitation light source group 5 is arranged so that each optical path of the excitation light group 50 to the phosphor is asymmetrical to the Y axis direction through the optical axis 100, the unconverted excitation light group 51 passes an optical path not corresponding to the optical path of the excitation light group 50 and returns to the excitation light source group 5 side.

FIG. 13(A) is a projection view in which the collimator lens group 6 is viewed from the X axis negative direction. The luminous flux cross-sectional shape of the excitation light group 50 is one after the excitation light group 50 has passed through the collimator lens group 6. The excitation light source group 5 and the collimator lens group 6 are arranged at equal intervals in the X axis direction and the Y axis direction, respectively, at the closest intervals determined from restriction of the outer shape of the excitation light source group 5 or the collimator lens group 6 to suppress each size of the condensing lens 4 and the dichroic mirror 7 to a compact size. When each outer shape of the excitation light source and the collimator lens is a circular shape, the X axis direction interval and the Y axis direction interval are equal to each other.

In the excitation light source group 5, the divergence angle of the emission light is not uniform, and the direction in which the divergence angle is maximum is substantially vertical to the direction in which the divergence angle is minimum; therefore, a luminous flux cross-sectional shape of the excitation light group 50 which is made parallel light by the collimator lens group 6 is a substantially elliptical shape in which the direction in which the divergence angle is maximum is the long axis direction. This drawing shows a case where the excitation light source group 5 is arranged so that the Y axis direction corresponds to the direction in which the divergence angle of the emission light of the excitation light group 50 is maximum. Note that, in this example, regarding the luminous flux width of the excitation light group 50 having passed through the collimator lens group 6, the excitation light source group 5 and the collimator lens group 6 are arranged so that the luminous width in the Y axis direction is narrowed such an extent that a gap larger than the luminous flux width in the Y axis direction is provided between the luminous fluxes in the Y axis direction.

FIG. 13(D) shows a change of a luminous flux diameter with respect to a distance between an emitting position of the excitation light source and the collimator lens. When the divergence angle θ is fixed, a distance L between the emitting position of the excitation light source and the collimator lens is reduced (L'), and the focal distance of the collimator lens is reduced, whereby a luminous flux diameter A can be reduced (A') while a luminous flux having passed through the collimator lens remains parallel. The luminous flux cross-sectional shape is similar to the case where a distance between the excitation light source group 5 and the collimator lens group 6 is large, and the size is reduced. Accordingly, in the excitation light having passed through the collimator lens, there is provided a distribution in which a gap larger than the luminous flux width in the Y axis direction is provided between the luminous light fluxes in the Y axis direction.

A gap larger than the luminous flux width in the Y axis direction of each excitation light is provided between the luminous fluxes in the Y axis direction of the excitation light group 50. Since the unconverted excitation light group 51 is the excitation light group 50 having regularly reflected on the phosphor symmetrically to the optical axis 100, the luminous flux cross-sectional shape of the unconverted excitation light group 51 is congruent with the luminous flux cross-sectional shape of the excitation light group 50 and is an ellipse in which the Y axis direction corresponds to the long axis direction. Accordingly, the excitation light source group 5 can be arranged so as to prevent the luminous flux of the unconverted excitation light group 51 from overlapping the luminous flux of the excitation light group 50.

Reflective mirrors 14s, 14t, and 14u are arranged in a direction vertically to unconverted excitation light groups 51s, 51t, and 51u at a position closer to the excitation light source group 5 side than the dichroic mirror 7 where the unconverted excitation light groups 51s, 51t, and 51u enter. Accordingly, the unconverted excitation light groups 51s, 51t, and 51u are reflected by the reflective mirrors 14s, 14t, and 14u to become reflected unconverted excitation light groups 52s, 52t, and 52u, and thus to travel in the opposite direction on optical paths similar to the unconverted excitation light groups 51s, 51t, and 51u and enter the excitation light irradiation region again (not shown). The reflected unconverted excitation light group 52 having entered the excitation light irradiation region again is converted into fluorescent light by the phosphor and enters on the illumination optical system side (not shown).

FIG. 13(B) is a projection view in which the condensing lens 4 is viewed from the Z axis negative direction. Since the reflecting mirror group 8 is arranged so that each reflecting mirror is shifted in the Z axis direction to such an extent that after the excitation light group 50 reflects the reflecting mirror group 8, the gap between the luminous fluxes in the X axis direction is smaller than the width of the luminous flux in the X axis direction, in the distribution of the excitation light group 50 on the condensing lens 4, the interval in the X axis direction of each excitation light group is smaller than that at the time of emission in FIG. 13(A), and the luminous flux range in the X axis direction is narrowed.

FIG. 13(C) is a projection view in which the reflecting mirror groups 8 and 14 are viewed from the Z axis negative direction. As in FIG. 13(B), in the distribution of the excitation light group 50 on the reflecting mirror group 8, the interval in the X axis direction of each excitation light group is smaller than that at the time of emission shown in FIG. 13(A), and the luminous flux range in the X axis direction is narrowed. The unconverted excitation light group 51 is the excitation light group 50 regularly reflected on the phosphor with respect to the optical axis 100, the luminous flux cross-sectional shape of the unconverted excitation light group 51 is congruent with the luminous flux cross-sectional shape of the excitation light group 50 and is an ellipse in which the Y axis direction corresponds to the long axis direction.

Since the reflected unconverted excitation light group 52 is the unconverted excitation light group 51 regularly reflected on the reflecting mirror group 14 arranged vertically to the unconverted excitation light group 51, the luminous flux cross-sectional shape of the reflected unconverted excitation light group 52 is congruent with the luminous flux cross-sectional shape of the unconverted excitation light group 51 and is an ellipse in which the Y axis direction corresponds to the long axis direction. Meanwhile, since the luminous flux width in the Y axis direction of the excitation light group 50 having passed through the collimator lens group 6 is smaller than the gap between the luminous fluxes in the Y axis direction, the excitation light group 50 can be arranged so that the unconverted excitation light group 52 is distributed in the gap. In this arrangement, the shape of the reflecting mirror group 14 is a strip shape elongated in the X axis direction. Note that if a range in which the unconverted excitation light group 51 can be captured is satisfied, the reflecting mirror 14 may be divided.

Since the excitation light group 50 emitted from the excitation light group 5 enters the excitation light irradiation region on the phosphor asymmetrically in the Y axis direction with respect to the optical axis 100, the unconverted excitation light group 51 and the unconverted excitation light group 51 are distributed to a gap in the Y axis direction of the excitation light group 50. Since there is provided a distribution in which the excitation light group 50 and the unconverted excitation light group 51 having an elliptical luminous flux cross-sectional shape whose long axis corresponds to the Y axis direction with respect the circular condensing lens 4 and the reflected unconverted excitation light group 52 are alternately arranged with a small gap in the Y axis direction, the effective range of the lens can be utilized effectively.

In comparison with FIG. 11(C), since the unconverted excitation light group 51 and the reflected unconverted excitation light group 52 are distributed in a gap in which the interval in the Y axis direction of the excitation light group 50 is the same and which corresponds to the reduced amount of the luminous flux width in the Y axis direction, the luminous flux passing region in the Y axis direction is not increased, and the size of the condensing lens 4 is not increased.

Accordingly, the excitation light source group 5 is arranged so that the Y axis direction corresponds to the direction in which the divergence angle of the emission light of the excitation light group 50 is maximum, a reflecting mirror in which an interval in the Y axis direction is larger than an interval in the X axis direction is used, and when the interval in the X axis direction of the excitation light group 50 is narrowed to such an extent that a gap in the X axis direction of each luminous flux of the excitation light group 50 is smaller than the width in the X axis direction of each luminous flux of the excitation light group 50 before incidence to the phosphor, the excitation light source group 5 is arranged so that the excitation light group 50 enters the excitation light irradiation region on the phosphor asymmetrically to the Y axis direction with respect to the optical axis 100, and after the excitation light group 50 passes through the collimator lens group 6, it is preferable that the distance between the emission position of the excitation light source group 5 and the collimator lens group 6 is reduced so that the gap in the Y axis direction of each luminous flux of the excitation light is larger than the width in the Y axis direction of each luminous flux of the excitation light group 50, and, at the same time, the focal length of the collimator lens is reduced.

In this example, although the reflecting mirror in which the interval in the Y axis direction is larger than the interval in the X axis direction is used, the same can be said for the case of narrowing the gap in the X axis direction (the direction in which the divergence angle is minimum) of the excitation light group 50 at an intermediate portion of an optical path with the use of other method to an extent to be smaller than the luminous flux width in the X axis direction. Moreover, there can be applied, not in the case where the gap in the X axis direction of the excitation light group 50 is narrowed at an intermediate portion of the optical path to an extent to be smaller than the luminous flux width in the X axis direction, but in the case where a gap through which the unconverted excitation light and the reflected unconverted excitation light pass is required to be provided in the Y axis direction for any reason. In this example, although the excitation light source group is arranged at equal intervals in the X axis direction and the Y axis direction, there is obviously applicable to other arrangement methods such as a hexagonal close-packed structure enabling the much closer arrangement.

In this example, although the luminous flux width is narrowed by changing a collimator lens in order to provide gaps, through which the unconverted excitation light and the reflected unconverted excitation light pass, between a plurality of excitation lights in the direction in which the divergence angle of the emission light of the excitation light source is maximum, an interval in the direction in which the divergence angle of the emission light of the excitation light source group is maximum may be expanded for the same purpose. Moreover, a method of changing a collimator lens and thereby narrowing the luminous flux width and a method of widening the interval in the direction in which the divergence angle of the emission light of the excitation light source group is maximum may be combined. Note that, when the interval in the direction in which the divergence angle of the emission light of the excitation light source group is maximum is expanded, the condensing lens, the dichroic mirror, and the reflecting mirror are increased in size by an increase of an arrangement area of the excitation light sources and an expansion of a luminous flux passing region; therefore, it is more preferable that the luminous flux width is narrowed by changing a collimator lens.

As described above, in the examples 3 to 7, although the unconverted excitation light not converted into fluorescent light among the excitation lights generated from the excitation light sources return to the position where the unconverted excitation light does not enter the excitation light source, when a reflecting mirror is disposed to permit capturing and reflecting the luminous flux, the reflecting mirror reflects the unconverted excitation light and can make the unconverted excitation light as the reflected unconverted excitation light enter the phosphor again. Consequently, the light amount of fluorescent light can be further increased while improving the output and life of the excitation light source. Since the unconverted excitation light not converted into the fluorescent light of the reflected unconverted excitation lights is regularly reflected by the phosphor and enters the excitation light source, the output and life of the excitation light source may be reduced; however, the light amount corresponds to unconverted amount after the excitation light enters the phosphor twice, the light amount is very small, and there is little to no influence.

Figure 3:
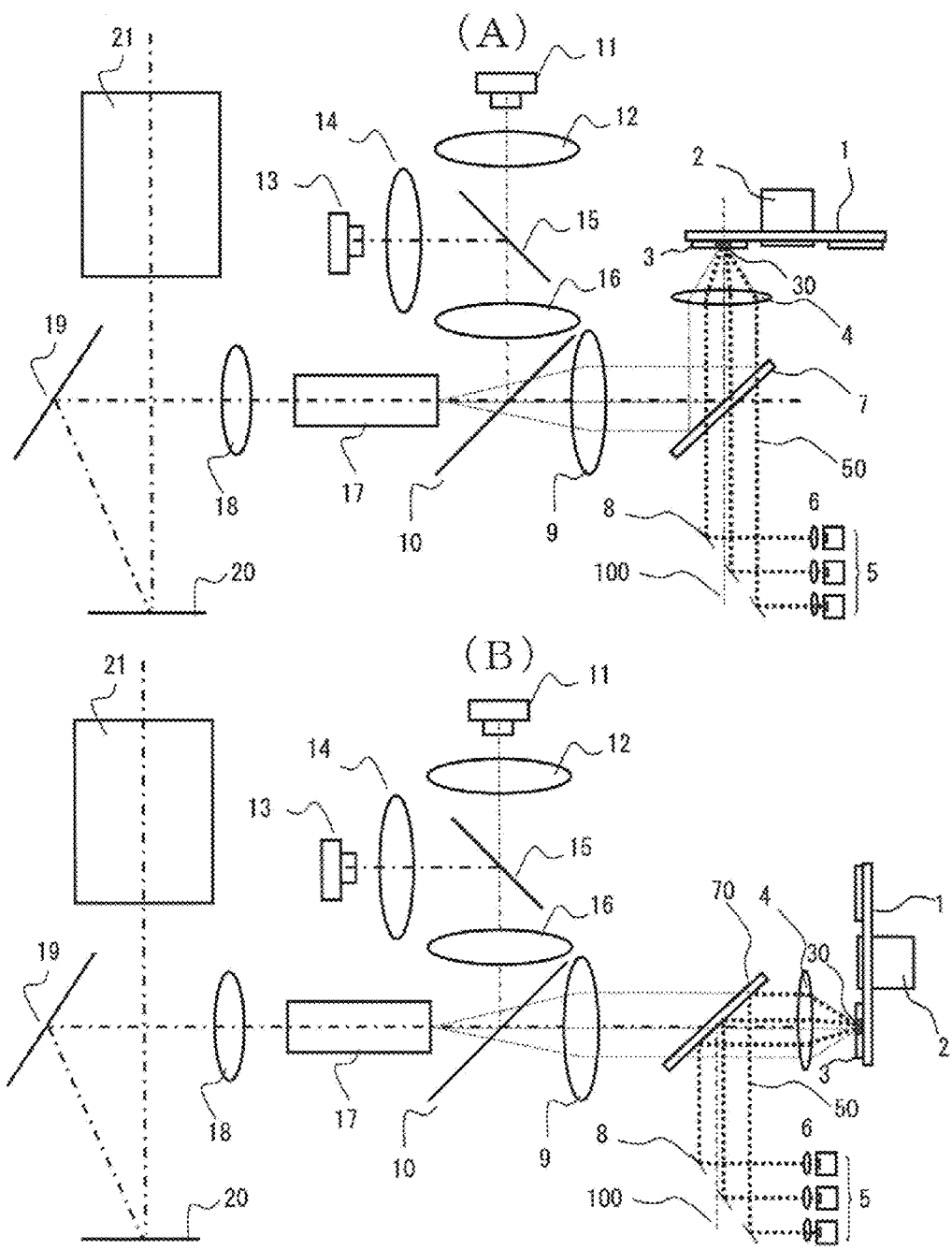
FIG. 3 is a schematic configuration diagram of an optical system of a projection type video display device.

Next, an optical system of a projection type video display device will be described. FIG. 3(A) is a schematic configuration diagram of the optical system of the projection type video display device including the light source device of FIG. 1. Blue excitation light emitted from the excitation light source group 5 is made substantially parallel by the collimator lens group 6 to be reflected by the reflecting mirror 8, and thus to enter the dichroic mirror 7. The dichroic mirror has a characteristic of transmitting blue light and reflecting green light. Accordingly, the blue excitation light transmits through the dichroic mirror 7 to be condensed by the condensing lens 4, and thus to be condensed on a disk 1.

The curvature of the condensing lens 4 is set so that parallel lights entering the condensing lens 4 are condensed at a portion of the disk 1. The disk 1 is a rotation-controllable circular base material, coated with the green phosphor 3, with the rotation element 2 as a center axis the rotation element 2 as a center axis. Green light generated by excitation of the green phosphor 3 and having transmitted through the condensing lens 4 among green fluorescent light emitted in all azimuths is substantially parallel to the optical axis 100 and is reflected by the dichroic mirror 7 to transmit through a condensing lens 9, and thus to enter a dichroic mirror 10. The dichroic mirror 10 has a characteristic of transmitting green light and reflecting red light and blue light. Accordingly, the green light transmits through the dichroic mirror 10 and enters a multiple reflection element 17. Since the curvature of the condensing lens 9 is set to such a value that lights are condensed at an incident opening of the multiple reflection element 17, a shape similar to an irradiation shape of the excitation light irradiation region 30 is formed at the incident opening surface of the multiple reflection element 17.

A light source 11 is a red light source. Red light emitted from the light source 11 is made parallel by a collimator lens 12 and enters a dichroic mirror 15. The dichroic mirror 15 has a characteristic of transmitting red light and reflecting blue light. Accordingly, the red light transmits through the dichroic mirror 15 to transmit through a condensing lens 16, and thus to enter the dichroic mirror 10.

Meanwhile, a light source 13 is a blue light source. Blue light emitted from the light source 13 is made parallel by a collimator lens 14 and enters a dichroic mirror 15. The dichroic mirror 15 has a characteristic of reflecting red light and reflecting blue light. Accordingly, the blue light is reflected by the dichroic mirror 15 to transmit through a condensing lens 16, and thus to enter the dichroic mirror 10. The dichroic mirror 10 has a characteristic of transmitting green light and reflecting red light and blue light. Accordingly, the red light and blue light having entered the dichroic mirror 10 are reflected by the 1 dichroic mirror 0 and enters the multiple reflection element 17.

Since the curvature of the condensing lens 16 is set to such a value that light is condensed at an incident opening of the multiple reflection element 17, a shape similar to a light-emitting shape of the light sources 11 and 13 is formed at the incident opening of the multiple reflection element 17. The arrangement position of the light sources 11 and 13 may be changed by changing the property of the dichroic mirror 15.

The red light, the green light, and the blue light having entered the multiple reflection element 17 are reflected by the multiple reflection element 17 a plurality of times and become light having a uniform illuminance distribution on an emission opening surface of the multiple reflection element 17. The emission opening surface of the multiple reflection element 17 has a shape substantially similar to a video display element 20. The curvature of a condensing lens 18 is set to such a value that an image formed on the emission opening surface of the multiple reflection element 17 is enlarged on the video display element 20 and imaged. Accordingly, the red light, the green light, and the blue light emitted from the emission opening surface of the multiple reflection element 17 transmit through the condensing lens 18 to be reflected by a reflecting mirror 19 and thereafter to be irradiated on the video display element 20 with the uniform illuminance distribution.

The excitation light source group 5, the light source 11, and the light source 13 are solid light-emitting elements with a high response speed and can be time-sharing controlled. Accordingly, each color light is modulated in time division for each color light by the video display element 20. Each color light reflected by the video display element 20 enters a projection lens 21 and is projected on a screen (not shown).

FIG. 3(B) is a schematic configuration view of an optical system of a projection type video display device including a light source device in an embodiment different from FIG. 3(A). Blue excitation light emitted from the excitation light source group 5 is made substantially parallel by the collimator lens group 6 and is reflected by the reflecting mirror 8 to enter a dichroic mirror 70. The dichroic mirror 70 has a characteristic of reflecting blue light and transmitting green light. Accordingly, blue excitation light reflects the dichroic mirror 70 to be condensed by the condensing lens 4, and thus to be condensed on the disk 1.

The curvature of the condensing lens 4 is set so that parallel light having entered the condensing lens 4 is condensed at a portion of the disk 1. The disk 1 is a rotation-controllable circular base material, coated with the green phosphor 3, with the rotation element 2 as a center axis. Among the green fluorescent lights generated by excitation of the green phosphor 3 and emitting in all azimuths, the green light transmitted through the condensing lens 4 is substantially parallel to the optical axis 100 and transmits through the dichroic mirror 70 to transmit through the 9, and thus to enter the dichroic mirror 10. The dichroic mirror 10 has a characteristic of transmitting green light and reflecting red light and blue light. Accordingly, the green light transmits through the dichroic mirror 10 and enters the multiple reflection element 17. Since the curvature of the condensing lens 9 is set to such a value that lights are condensed at the incident opening of the multiple reflection element 17, a shape similar to the irradiation shape of the excitation light irradiation region 30 is formed at the incident opening surface of the multiple reflection element 17. The subsequent components of the optical system are the same as those in FIG. 3(A) and are omitted.

The video display element in this example may be a DMD (Digital Mirror Device) element or a liquid crystal video display element (liquid crystal panel).

In this example, the phosphor 3 is rotated. This is because since an organic silicon resin or the like is used as a binder dispersing and curing the phosphor, burning due to a high temperature is required to be prevented. However, the phosphor may not be rotated as long as the life of the phosphor can be secured by using an inorganic binder, for example.

In this example, although a plurality of the excitation light sources exist, when the excitation light emitted from the excitation light source enters the excitation light irradiation region to be reflected without being converted into fluorescent light, the number of the excitation light source may be one as long as the excitation light sources are arranged so as to prevent the unconverted excitation light from entering the excitation light source.

Reference Signs List
1 disk
2 rotation element
3 phosphor
4 condensing lens
5 excitation light source group
6 collimator lens group
7 dichroic mirror
8 reflecting mirror (for reflecting excitation light)
30 excitation light irradiation region
50 excitation light group
51 unconverted excitation light group
52 reflected unconverted excitation light group
60 fluorescent light
70 dichroic mirror
9 to 14 reflecting mirror (for reflecting unconverted excitation light)

The invention claimed is:

1. A light source device, comprising:
a plurality of excitation light sources which emit excitation light;
a phosphor which changes the excitation light to fluorescent light;
a dichroic mirror which transmits the excitation light and reflects the fluorescent light; and
a condensing lens which condenses the excitation light transmitted through the dichroic mirror in an excitation light irradiation region on the phosphor,
wherein the plurality of light sources are arranged so that each excitation light emitted from each of the plurality of light sources enters asymmetrically to a center of the condensing lens; and
wherein when the excitation light irradiation region is a center and an incident angle to the excitation light irradiation region of any excitation light of each of the excitation light is an elevation angle $\theta$, $$\theta \neq 0$$

is satisfied.

2. The light source device according to claim 1, wherein each of the excitation lights enters the excitation light irradiation region from all of four quadrants with a center of the condensing lens as an original point.

3. The light source device according to claim 1, wherein when the excitation light irradiation region is a center, in an incident angle to the excitation light irradiation region of first excitation light of each of the excitation lights, an elevation angle is $\theta m$ and an azimuth angle is $\phi m$, and in an incident angle to the excitation light irradiation region of second excitation light different from the first excitation light, an elevation angle is $\theta n$ and an azimuth angle is $\phi n$, there is no pair of the excitation lights in which $$\theta m-2° \leq \theta n \leq \theta m+2°, \text{ and } \phi m+178° \leq \phi n \leq \phi m+182°$$

are established.

4. The light source device according to claim 1, wherein the excitation light source is a solid light-emitting element.

5. The light source device according to claim 1 being disposed so that a divergence angle of light emitted from the excitation light source is not uniform, a direction in which the divergence angle of the light emitted from the excitation light source is maximum is vertical to a direction in which the divergence angle is minimum, and
the direction in which the divergence angle of the light emitted from the excitation light source is maximum is vertical to at least one axial direction in which each excitation light emitted from each of the plurality of excitation light sources is asymmetrical to a center of the condensing lens.

6. The light source device according to claim 1, further comprising a collimator lens which makes excitation light emitted from an excitation light source substantially parallel and the light source being disposed so that a divergence angle of light emitted from the excitation light source is not uniform, a direction in which the divergence angle of the light emitted from the excitation light source is maximum is vertical to a direction in which the divergence angle is minimum, and the direction in which the divergence angle of the light emitted from the excitation light source is maximum and at least one axial direction in which each excitation light emitted from each of the plurality of excitation light sources is asymmetrical to a center of the condensing lens are parallel to each other, wherein the excitation light source and the collimator lens are arranged so that a gap between luminous fluxes of a plurality of excitation lights having passed through the collimator lens in the direction in which the divergence angle of the emission light from the excitation light source is maximum is larger than a luminous flux width in a direction in which a divergence angle of excitation lights collimated after passing through the collimator lens is maximum.

7. A projection type video display device, comprising:
the light source device according to claim 1;
a video display element;
an illumination optical system which has a plurality of optical elements applying light from the light source device to the video display element; and
a projection lens which enlarges and projects an optical image formed by the video display element.

8. A light source device, comprising:
a plurality of excitation light sources which emit excitation light;
a phosphor which changes the excitation light to fluorescent light;
a dichroic mirror which reflects the excitation light and transmits the fluorescent light; and
a condensing lens which condenses the excitation light reflected by the dichroic mirror in an excitation light irradiation region on the phosphor,
wherein the plurality of light sources are arranged so that each excitation light emitted from each of the plurality of light sources enters asymmetrically to a center of the condensing lens; and
wherein when the excitation light irradiation region is a center and an incident angle to the excitation light irradiation region of any excitation light of each of the excitation light is an elevation angle θ,

θ≠0 is satisfied.

9. A light source device, comprising:
an excitation light source which emits excitation light;
a phosphor which changes the excitation light to fluorescent light;
a dichroic mirror which transmits the excitation light and reflects the fluorescent light; and
a condensing lens which condenses the excitation light transmitted through the dichroic mirror in an excitation light irradiation region on the phosphor,
wherein the excitation light sources are arranged so that when excitation light emitted from the excitation light source enters the excitation light irradiation region and is reflected without being converted into fluorescent light, the unconverted excitation light is prevented from entering the excitation light source; and
wherein when the excitation light irradiation region is a center and an incident angle to the excitation light irradiation region of any excitation light of each of the excitation light is an elevation angle θ,

θ≠0 is satisfied.

10. The light source device according to claim 9, further comprising a reflecting mirror reflecting the unconverted excitation light toward the excitation light irradiation region.

11. A light source device, comprising:
an excitation light source which emits excitation light;
a phosphor which changes the excitation light to fluorescent light;
a dichroic mirror which reflects the excitation light and transmits the fluorescent light; and
a condensing lens which condenses the excitation light reflected by the dichroic mirror in an excitation light irradiation region on the phosphor,
wherein the excitation light source is disposed so that when excitation light emitted from the excitation light source enters the excitation light irradiation region and is reflected without being converted into fluorescent light, the unconverted excitation light is prevented from entering the excitation light source; and
wherein when the excitation light irradiation region is a center and an incident angle to the excitation light irradiation region of any excitation light of each of the excitation light is an elevation angle θ,

θ≠0 is satisfied.

12. A light source device, comprising:
a plurality of excitation light sources which emit excitation light;
a phosphor which changes the excitation light to fluorescent light;
a dichroic mirror which transmits the excitation light and reflects the fluorescent light; and
a condensing lens which condenses the excitation light transmitted through the dichroic mirror in an excitation light irradiation region on the phosphor,
wherein the plurality of light sources are arranged so that each excitation light emitted from each of the plurality of light sources enters asymmetrically to a center of the condensing lens; and
wherein each of the excitation lights enters the excitation light irradiation region from all of four quadrants with a center of the condensing lens as an original point.

13. A light source device, comprising:
a plurality of excitation light sources which emit excitation light;
a phosphor which changes the excitation light to fluorescent light;
a dichroic mirror which transmits the excitation light and reflects the fluorescent light; and
a condensing lens which condenses the excitation light transmitted through the dichroic mirror in an excitation light irradiation region on the phosphor,
wherein the plurality of light sources are arranged so that each excitation light emitted from each of the plurality of light sources enters asymmetrically to a center of the condensing lens; and
wherein the light source device is disposed so that a divergence angle of light emitted from the excitation light source is not uniform, a direction in which the divergence angle of the light emitted from the excitation light source is maximum is vertical to a direction in which the divergence angle is minimum, and the direction in which the divergence angle of the light emitted from the excitation light source is maximum is vertical to at least one axial direction in which each excitation light emitted from each of the plurality of excitation light sources is asymmetrical to a center of the condensing lens.

14. A light source device, comprising:

a plurality of excitation light sources which emit excitation light;

a phosphor which changes the excitation light to fluorescent light;

a collimator lens which makes excitation light emitted from an excitation light source substantially parallel;

a dichroic mirror which transmits the excitation light and reflects the fluorescent light; and a condensing lens which condenses the excitation light transmitted through the dichroic mirror in an excitation light irradiation region on the phosphor, wherein the plurality of light sources are arranged so that each excitation light emitted from each of the plurality of light sources enters asymmetrically to a center of the condensing lens;

wherein the light source being disposed so that a divergence angle of light emitted from the excitation light source is not uniform, a direction in which the divergence angle of the light emitted from the excitation light source is maximum is vertical to a direction in which the divergence angle is minimum, and the direction in which the divergence angle of the light emitted from the excitation light source is maximum and at least one axial direction in which each excitation light emitted from each of the plurality of excitation light sources is asymmetrical to a center of the condensing lens are parallel to each other, wherein the excitation light source and the collimator lens are arranged so that a gap between luminous fluxes of a plurality of excitation lights having passed through the collimator lens in the direction in which the divergence angle of the emission light from the excitation light source is maximum is larger than a luminous flux width in a direction in which a divergence angle of excitation lights collimated after passing through the collimator lens is maximum.

* * * * *